United States Patent [19]

Si

[11] Patent Number: 4,809,162

[45] Date of Patent: Feb. 28, 1989

[54] SAVING REGISTERS IN DATA PROCESSING APPARATUS

[75] Inventor: Stephen S. C. Si, Sunnyvale, Calif.

[73] Assignee: Amdahl Corporation, Sunnyvale, Calif.

[21] Appl. No.: 58,047

[22] Filed: Jun. 4, 1987

Related U.S. Application Data

[63] Continuation-in-part of Ser. No. 925,997, Oct. 31, 1986.

[51] Int. Cl.⁴ ............................. G06F 1/04; G06F 9/22
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,840,727 | 10/1974 | Amdahl et al. | 235/164 |
| 4,587,611 | 5/1986 | Amdahl et al. | 364/200 |
| 4,589,067 | 5/1986 | Porter et al. | 364/200 |
| 4,707,783 | 11/1987 | Lee et al. | 364/200 |

Primary Examiner—Gary V. Harkcom
Assistant Examiner—Christopher H. Lynt
Attorney, Agent, or Firm—Fliesler, Dubb, Meyer & Lovejoy

[57] ABSTRACT

Data processing apparatus includes a data path having a path delay, from a source latch point to a destination latch point, of greater than one clock cycle. For an n-cycle path, where the path delay is between n—1 and n clock cycles, data is latched into the source latch point at least n clock cycles in advance of the cycle on which it is needed at the destination latch point. The data and gating signals along the data path are held glitch-free in the source latch point until after the clock cycle on which the data is used in the destination latch point.

15 Claims, 3 Drawing Sheets

SAVING REGISTERS IN DATA PROCESSING APPARATUS

CROSS-REFERENCE TO RELATED APPLICATIONS

This application is a continuation-in-part of allowed U.S. application Ser. No. 925,997, filed Oct. 31, 1986, entitled HIGH SPEED FLOATING-POINT UNIT, which Application is currently owned, and was owned at the time of invention, by the same assignee as the present application. The parent application is incorporated by reference as if fully set forth herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This Application is related to U.S. patent application Ser. No. 907,060, filed Sept. 11, 1986, entitled SAVING CYCLES IN FLOATING POINT DIVISION, now U.S. Pat. No. 4,760,550 which application is currently owned, and was owned at the time of invention, by the same assignee as present application. The related application is incorporated by reference as if fully set forth herein.

BACKGROUND OF THE INVENTION

1. Field of the Invention

The invention relates to data processing apparatus, and more particularly to control mechanisms by which data and control paths having a path delay of greater than one clock cycle may be accommodated in order to avoid the necessity of adding redundant latch points close to the functional units in which they are needed.

2. Description of Related Art.

Typical data processing apparatus can be thought of as being divided into data paths and latch points. A latch point is any component that provides an output on the basis of system conditions existing on a particular edge of a clock signal. The system conditions may include either the logic level of various signals coupled to inputs of the latch point, or the previous state of the latch point. Latch points may be implemented using, for example, edge-triggered or master-slave flip flops or registers.

Data paths are the connections by which data and/or control signals pass between one latch point and another or the outside world. As the term is used herein, a data path may include various combinational logic circuits. For example, two source latch points, which provide alternate sources for data to be received by a destination latch point, may each be coupled to the destination latch point through a single data selector. In response to a control signal, the data selector selects one of the two source latch points to provide the data to the destination latch point. In this situation, the path from each of the two source latch points, through the data selector, to the destination latch point constitutes a separate data path. Additionally, it will be understood that the terms "data" and "control signal" are frequently used interchangeably, such that the term "data path", as used herein, can carry either data signals or control signals or both. Thus, the path from the latch point containing the control signal, through the data selector, to the destination latch point constitutes an additional data path.

A data path has associated with it a path delay, which is the amount of time required from the clock signal edge on which data is latched into a source latch point, until the data reaches the input of a destination latch point with sufficient stability such that if a clock edge occurred at that time, the data would be latched into the destination latch point accurately. A path delay may be caused by long wires, by chip crossings, by logic delays inherent in combination circuits at intermediate points in the data path, by the clock skew between the source and destination latch point, or by the maximum latch-up time of the latches used. Additionally, some implementations of a latch point will recognize the system conditions on the rising edge of a clock pulse, but transfer such conditions to the outputs only on the falling edge of the clock pulse. For such implementations, the path delay includes the half-cycle between the rising and falling edges of the clock signal.

Latch points and data paths are typically grouped together in specific combinations to form functional units of the data processing apparatus. Such functional units may include, for example, a divider complex, a register complex, etc. Depending on where the lines are drawn, a functional unit may be considered to include or exclude various latch points or data paths, or parts thereof. For example, a multiplier complex functional unit may include an adder functional unit within its boundaries. It also may or may not be considered to include ingating and outgating combinational logic.

The various latch points and combinational logic circuits typically operate under the control of a control unit. A control unit may be microcoded or hardwired, and it generates control signals which are updated once every clock cycle. Programmed signals may be presented to the control unit from an Instruction Unit, for example, which tells the control unit to have a certain machine level instruction executed. In general, the cycle time can be no faster than the longest data path between two latch points under the control of the control unit. Otherwise, the usual practice is either to slow the clock frequency, which degrades the throughput of the entire computer system, or divide the longest data paths into two or more segments by inserting additional intermediate latch points.

In order to maintain fast cycle times, the prior art teaches that the various latch points which are needed for a given operation should be placed as close as possible to (or within) the functional unit which performs that operation. For example, for a multi-step multiplier unit, the prior art teaches that the multiplicand should be brought into a local register in order to keep the path delay between the multiplicand register and the other latch points in the multiplier unit short, to thereby minimize the cycle time required. One problem with this philosophy is that, taken to its extreme, it would require all latch points to be placed near each other for speed. This is obviously impossible to achieve.

Additionally, LSI real estate is still at a premium in those technologies employed in high speed data processing systems. A redundant local register can occupy as much as 20% of the space used to implement the functional unit. The designer is therefore forced to choose between long path delays and consequently long cycle times on one hand, or extra LSI real estate to hold redundant local registers on the other hand.

SUMMARY OF THE INVENTION

It is an object of the present invention to provide data processing apparatus which alleviates the problems described above.

It is another object the present invention to provide data processing apparatus in which the clock frequency is no longer limited by the longest path delay between two latch points.

It is another object of the present invention to provide data processing apparatus in which the need for redundant intermediate or local registers is avoided.

These and other objects are accomplished according to the invention by providing data processing apparatus in which the path delay between two of its latch points is longer than one clock cycle. Usually the path delay will be between 1 and 2 clock cycles, but in the general case it may be between n−1 and n clock cycles. Means are included for latching data into the source latch point at least n clock cycles in advance of the cycle on which it is needed at the destination latch point, and means are provided for holding the data, glitch-free, in the source latch point until after the clock cycle on which it is used in the destination latch point. In this way, long data paths may be accommodated in the data processing apparatus without any need to slow the clock frequency or add intermediate latch points. Moreover, the inventive apparatus will operate consistently at any clock frequency between single cycle and the maximum rated clock frequency, since the apparatus holds the data in the source latch point constant and glitch-free until after the clock cycle on which it is used in the destination latch point.

Data processing apparatus incorporating the invention may also perform useful work during the n clock cycles during which the data is flowing from the source latch point to the destination latch point. Thus, in one variation, setup work is performed in the functional unit incorporating the destination latch point under proper control of the control unit during the interim cycle(s).

In another aspect of the invention, two separate paths having different path delays may be joined by combinational logic before the input of a destination latch. The path delay in the first path may be between n−1 and n clock cycles, and the path delay in the second path may be between m−1 and m cycles. In such a situation, means are provided to load and hold data in the source latch point for the first data path for at least the n cycles prior to the cycle on which it is needed at the destination latch point, and means are provided to load and hold the source latch point on the second data path for at least the m clock cycles prior to the cycle on which the data is needed at the destination latch point. If m<n, then the source latch point on the second data path may safely be used for other purposes between the n'th and m'th clock cycle prior to the cycle on which data is expected at the destination latch point.

In yet another aspect, a single source latch point may have data paths leading to two or more destination latch points. In such a situation, means are provided for loading and holding data in the source latch point long enough in advance to accommodate the longest data path, it being realized that the destination latch points having a shorter path delay from the source latch point may begin using the data on an earlier clock cycle.

DETAILED DESCRIPTION

Additional objects and features of the invention will appear from the following description in which preferred embodiments of the invention have been set forth in detail in conjunction with the drawings. The description below shows one embodiment of how the invention may be used in a high performance mainframe computer, in particular in the floating point unit (FPU) of such a computer.

Figure 1:
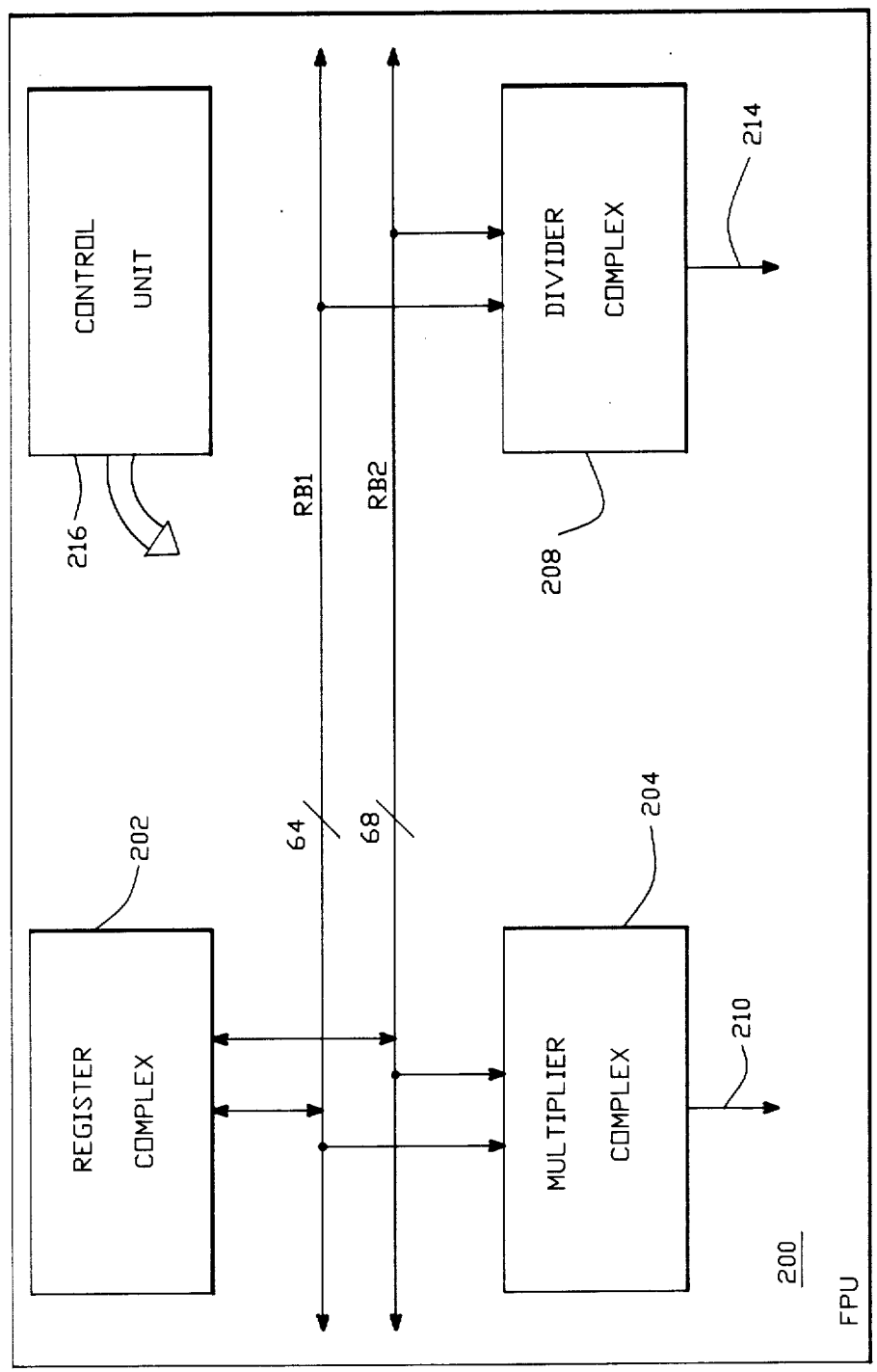
FIG. 1 shows a block diagram of relevant portions of a floating point unit (FPU) of a mainframe computer incorporating the invention.

In FIG. 1 there is shown a block diagram of an FPU 200. It comprises a register complex 202, a multiplier complex 204 and a divider complex 208. Many other functional units are included in the FPU 200, but they are not shown since they are not important to a description of the invention. In particular, the FPU 200 further includes a functional unit (not shown) which performs exponent calculations. The FPU 200 also includes two read buses RB1 and RB2. The register complex 202 is connected so as to source data to each of the read buses RB1 and RB2, and the multiplier complex 204 and the divider complex 208 are connected to the read buses RB1 and RB2 so as to receive data therefrom. The multiplier complex 204 and the divider complex 208 additionally have output buses connected to them, respectively buses 210 and 214, a further description of which is not important to a description of the invention. RB1 is 64 bits wide, so as to accommodate both one-word and two-word wide operands. One-word wide operands are used in short format instructions, whereas two-word wide operands are used in long format instructions. Read bus RB2 is 68 bits wide for the same reason, the extra four bits in RB2 being used for instructions which require extra precision.

The entire FPU 200 operates under the control of a control unit 216, which generates control signals for controlling the various latch points and data paths in the various functional units of the FPU 200. Also included in the FPU 200 is a clock signal, not shown in FIG. 1, which is transmitted to each of the functional units of the FPU 200.

In general operation, the control unit 216 receives a machine-level instruction from an outside source such as an Instruction Unit (not shown). Control in the control unit 216, which is microcoded, then proceeds to a section of microcode designed to execute the specified machine-level instruction. For the instructions described herein, it is sufficient only to note at this point that part of the execution includes the step of providing two operands from the register complex, via the read buses RB1 and RB2, to one of the functional units 204 or 208.

Figure 2:
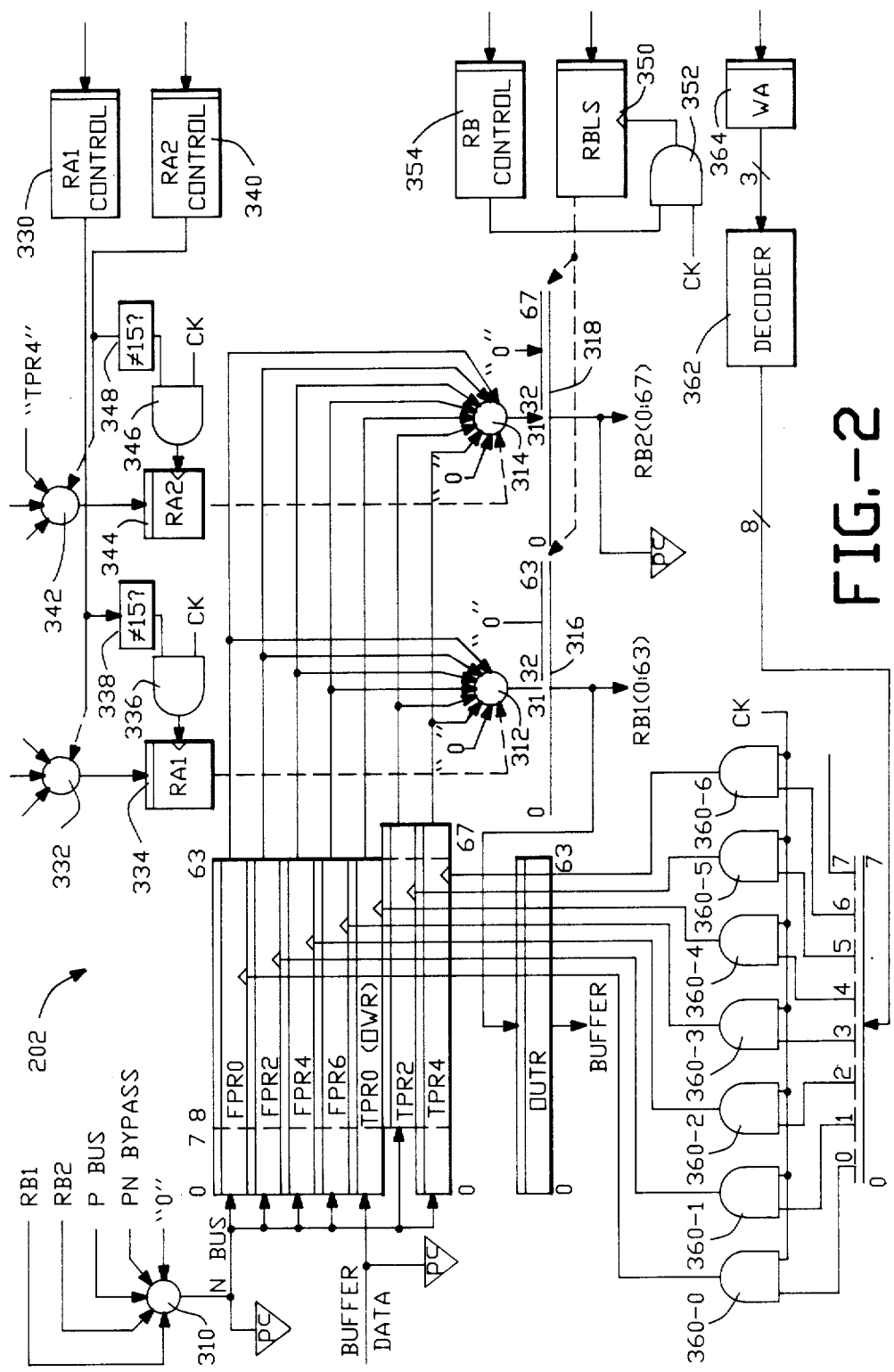
FIG. 2 shows a schematic diagram of the register complex shown in FIG. 1.

FIG. 2 shows the register complex 202 in more detail. It comprises seven data registers labels FPR0, FPR2, FPR4, FPR6, TPR0, TPR2 and TPR4. In addition, there is an output data register labeled OUTR. Registers FPR0, FPR2, FPR4, FPR6, TPR0 and OUTR are each 64 bits wide, and data register TPR4 is 68 bits wide. Data register TPR2 is 60 bits wide, but is coupled to read buses RB1 and RB2 with its high-order bit in bit 8 of such buses. The fractional part of a floating point operand is usually stored in bits 8–63 (or 8–67) of these registers, and the exponent is usually stored in bits 0–7.

The data inputs to each of the data registers except for TPR0 is connected to a write bus W BUS. The data input for data register TPR0 is connected to an external source (e.g. a buffer, not shown) of data. W BUS is connected to the output of a data selector 310, which selects data under the control of control unit 216 from RB1, RB2, P BUS or PN Bypass. The latter two data sources are described below.

The data output of each of the data registers except for TPR0 is connected to a data input of a data selector 312. Another data input of data selector 312 is connected to a 64-bit double word of all zeros. The data output of each of the data registers including TPR0 is also connected to a data input of a data selector 314. Data selector 314 also has another data input connected to all zeros. The outputs of data selectors 312 and 314 are connected respectively to data selectors 316 and 318. Data selector 316 has an output connected to RB1, and can select either the full 64-bit quantity supplied by data selector 312, or a 64-bit quantity consisting of the high-order 32 bits from data selector 312 and zeros in the low-order 32 bits. Data selector 318 has an output connected to RB2, and can select either the full 68-bit quantity supplied by data selector 314, or a 68-bit quantity consisting of the high-order 32 bits supplied by data selector 314 and zeros in the low-order 36 bits. RB1, in addition to being connected outside the register complex 202, is also connected to the data input of output data register OUTR. The data output of OUTR is connected to other points outside the FPU (e.g. buffers, not shown) which are not important in the present description.

For simplicity, it will be assumed that each of the data registers FPR0, FPR2, FPR4, FPR6, TPR0, TPR2 and TRP4 are rising-edge triggered latches. That is, they constitute latch points which update their outputs on the basis of the information at their inputs when the signal at their respective clock inputs makes a transition from a low level to a high level. It will be assumed that all latch points referred to in this description are rising-edge triggered. Additionally, unless a clock input for a particular latch point is specifically shown in the diagrams or referred to in the text, it will be understood that such clock inputs may be considered, for the purposes of this description, to be connected directly (ungated) to the clock signal. The connections to the clock inputs of the data registers, as well as the connections to the control inputs of data selectors 312, 314, 316 and 318, are described below.

The control signals generated by control unit 216 are connected to control store latches, five of which are shown in FIG. 2. The inputs to these latches are coupled directly to the control store outputs for corresponding fields of microcode. One of the control store latches, RA1 control latch 330, has an output coupled to the select input of a data selector 332. Data selector 332 can select information from any of several sources (not shown) to generate an output signal coupled to the input of an RA1 latch 334. The output of RA1 latch 334 provides the control signal for data selector 312. The clock input for RA1 latch 334 is gated by a gate 336, the control input of which is connected to a comparator 338, which compares its input to the number 15. The input of comparator 338 is connected to the output of RA1 control latch 330.

Thus, if on a particular clock cycle, referred to herein as the setup clock cycle, RA1 control latch 330 contains any value other than 15, then the output of comparator 338 will be active and the gate 336 will permit the clock signal corresponding to that clock cycle to reach the clock input of RA1 latch 334. The value in RA1 control latch 330 will therefore cause data selector 332 to select a corresponding one of its inputs, which will be loaded into RA1 latch 334 on the setup clock cycle. On the other hand, if RA1 control latch 330 contains the value 15 on the setup clock cycle, the output of comparator 338 will be inactive and gate 336 will prevent the setup clock cycle from reaching the clock input of RA1 latch 334. RA1 latch 334 will therefore retain the value that it contained prior to the setup clock cycle. Additionally, since the clock input of RA1 register 334 is actually being gated, instead of merely recirculating the output of RA1 register 334 back to its input, the output glitches which sometimes accompany such recirculations are avoided. As used herein, since all latch points are considered to be rising-edge triggered, any state which is said to exist "on" a particular clock cycle exists prior to the rising edge of such clock cycle. The state is captured in a latch point in response to such rising edge. Events said to occur on a clock cycle are set up prior to the rising edge of such clock cycle and latched on the rising edge.

The control input of data selector 314 is operated in a similar manner to that of data selector 312. An RA2 control latch 340 receives information from the appropriate field in control store (not shown). The output of RA2 control latch 340 is connected to the control input of a data selector 342, which may select data from any of several sources (not shown). The output of data selector 342 is connected to the input of an RA2 register 344, the output of which is connected to the control input of data selector 314. As with RA1 register 334, the clock input of RA2 register 344 is gated by a gate 346, the control input of which is connected to the output of a comparator 348. The comparator 348 compares its input to the value 15, which input is connected to the output of RA2 control register 340. As with RA1 register 334, RA2 register 344 will be loaded with the value selected by data selector 342 under the control of RA2 control latch 340 on a particular clock cycle only if RA2 control latch 340 contains a value other than 15 prior to that clock cycle. Otherwise, the clock input of RA2 register 344 does not see the particular clock cycle, and the output of RA2 register 344 remains constant and glitch-free through that clock cycle.

Data selectors 316 and 318 are controlled according to whether the particular machine-level instruction which is being executed is a short or long-format instruction. The control inputs of both of the data selectors 316 and 318 are connected to the output of an RBLS control store latch 350. The clock input of RBLS latch 350 is gated by a gate 352, the control input of which is connected to the output of another control store latch RB control latch 354.

In operation, it is usually desirable to set RBLS latch 350 when the execution of a machine-level instruction begins, and leave it that way for the remainder of the execution of such instruction. Thus, typically, the microcode word which is active on the clock cycle prior to a setup clock cycle contains a value in the RB control field (for loading into RB control latch 354 on the clock cycle prior to the setup clock cycle) which would cause gate 352 to permit clock cycles to reach RBLS latch 350. That value (an "enabling" value) is loaded into RB control latch 354 on the clock cycle prior to the setup clock cycle, ensuring that the rising edge of the setup clock cycle, when it arrives, will reach RBLS register 350. On the setup clock cycle, the microcode word which is then active contains the appropriate value (long or short) in the RBLS field, and the RB control field contains a "disabling" value. Thus, when the rising edge of the setup clock cycle arrives, the values in these two fields are loaded into the respective control store latches. Since RB control register 354 now contains the disabling value, the output of RBLS latch 350 will remain constant, regardless of the value at its input, when the clock cycle following the setup clock cycle arrives. Additionally, since there is no recirculation involved, the output of RBLS latch 350 will not contain a glitch which could result from such recirculation when the clock cycle arrives.

The means by which the outputs of the data registers FPR0, FPR2, FPR4, FPR6, TPR0, TPR2, and TPR4 are held constant and glitch-free is shared by the means by which write addressing is performed on such data registers. Each data register has a clock input, which is gated by a respective gate 360-0, 360-1, 360-2, 360-3, 360-4, 360-5 and 360-6, respectively (referred to collectively as gates 360). The control inputs of the gates 360 are connected to respective bits 0–6 of the 8-bit output of a three line to eight line decoder 362. Bit seven of the output of decoder 362 is not connected. The three-bit input to decoder 362 is connected to the output of a write address (WA) control store latch 364.

When it is desired to write data into a particular one of the data registers on a setup clock cycle, for example data register TPR4, the address of that data register is loaded into WA latch 364 on the clock cycle prior to the setup clock cycle. For data register TPR4, the address is 6. The decoder 362 decodes the value now in WA latch 364 and activates only bit 6 of its output, all other bits of the decoder 362 output remaining inactive. Thus, when the rising edge of the setup clock cycle arrives, the only one of the gates 360 which will permit the edge to reach the clock input of its corresponding data register will be gate 360-6. Only data register TPR4 will load the information on the write bus on the setup clock cycle.

If WA latch 364 is loaded on the setup clock cycle with some value other than 6, then gate 360-6 will prevent the clock cycle following the setup clock cycle from reaching the clock input of TPR4. The output of data register TPR4 will therefore remain constant and glitch-free during the clock cycle following the setup clock cycle. Note that if the address placed in WA latch 364 is the address of another one of the data registers, then that data register will load in data from the write bus on the clock cycle following the setup clock cycle. In case this is not desired, the value '7' may be written into WA latch 364. The output of decoder 362 which corresponds to a write address of '7' does not control the clock input of any data register, thereby causing all the data registers to retain their previous values, glitch-free, when the clock cycle following the setup clock cycle arrives.

In order to more fully understand the invention, the operation of register complex 202 will be described with respect to a floating point multiplier operation.

The details of multiplier complex 204 will therefore now be described. For simplicity, the multiplier complex 204 as described herein is merely illustrative, and not intended to reflect any actual implementation.

Figures 3, 4:
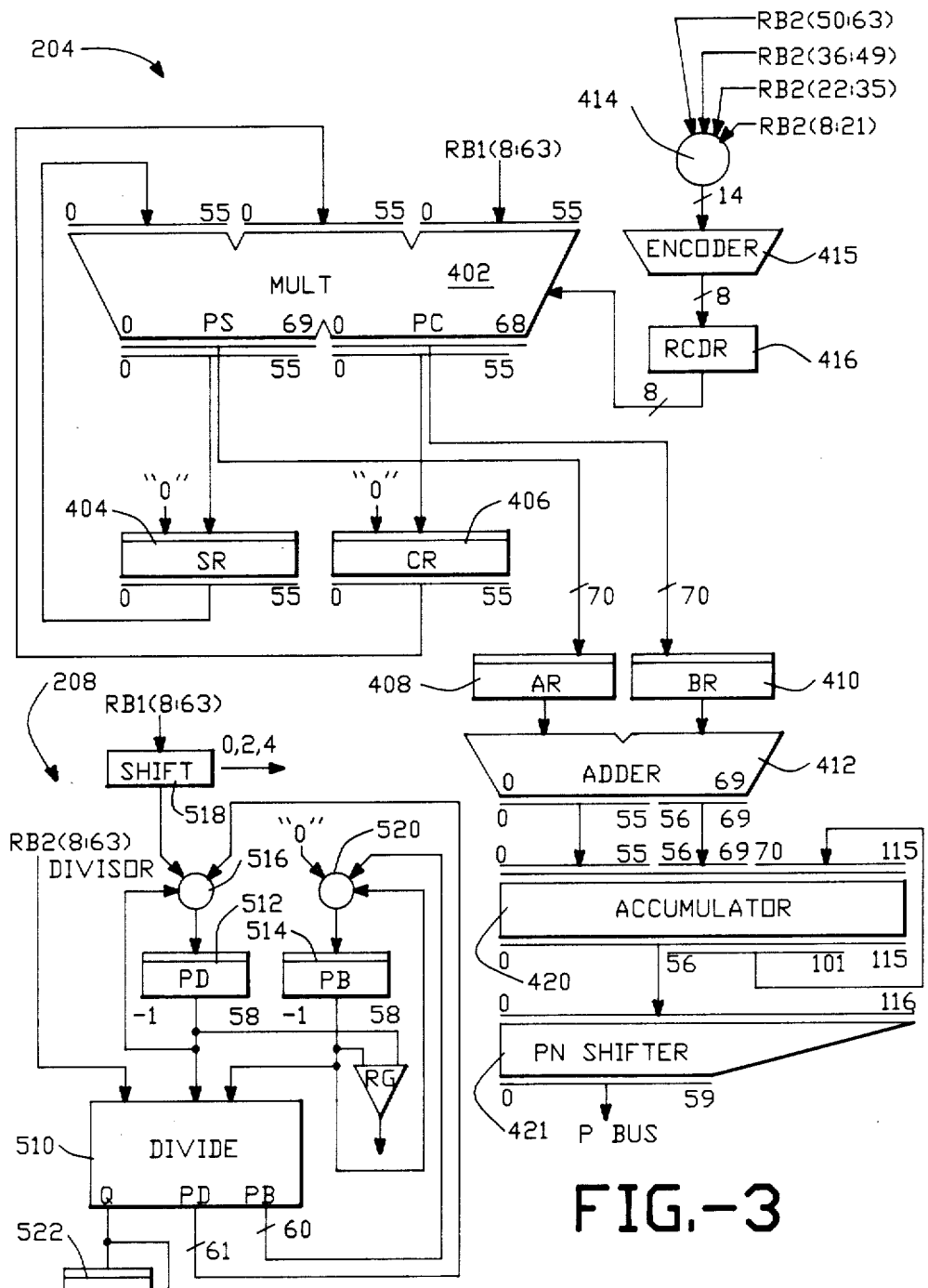
FIG. 3 shows a schematic diagram of the multiplier complex shown in FIG. 1.
FIG. 4 shows a schematic diagram of the divider complex shown in FIG. 1.

The multiplier complex 204 is in effect a 56 by 14-bit multiplier set up to do a full 56 by 56-bit multiplication in four iterations. Referring to FIG. 3, multiplier complex 204 comprises a multiplier 402, having three 56-bit inputs (referred to as the first, second and third inputs), and one 8-bit input for an encoded version of a 14-bit portion of a multiplier value (referred to as the fourth input). A similar implementation is described in U.S. Pat. No. 3,840,727, entitled BINARY MULTIPLICATION BY ADDITION WITH NON-OVERLAPPING MULTIPLIER RECORDING, incorporated herein by reference. The multiplier 402 is a combinational circuit which multiplies the values at the third and fourth inputs, then adds in the values at the first and second inputs. The multiplier 402 generates a partial sum PS and partial carry PC, both 70 bits wide. The high-order 56 bits of the PS signal are connected to the input of a 56-bit SR register 404, the output of which is recirculated to the first input of the multiplier 402. The high-order 56 bits of PC are connected to the input of a CR register 406, the output of which is recirculated to the second input of multiplier 402. All 70 bits of PS are also connected to the input of an AR register 408, and all 70 bits of PC are connected to the input of a BR register register 410.

The outputs of AR register 408 and BR register 410 are connected to two inputs of an adder 412, which generates its own 70-bit output. The 70 bits of the output of adder 412 are connected to the inputs of the high-order 70 bits of a 116-bit wide accumulator register 420. Bits 56–101 of the output of accumulator register 420 are recirculated and connected back to the low-order 46 bits of the input of accumulator register 420 (bits 70–115), so that on each clock cycle, the value in accumulator register 420 is effectively shifted to the right by 14 bits and the newly available bits 56–69 are filled with the low-order 14 bits of the output of adder 412. All 116 bits of the output of accumulator 420 are coupled to a post-normalization (PN) shifter 421, the 60-bit output of which is coupled via a P BUS to another input of data selector 310 (FIG. 2).

The third 56-bit input of multiplier 402 is connected to RB1 bits 8–63, to accept the fractional part of the multiplicand. Exponent calculations take place in a separate functional unit (not shown), and are not described herein. The 56-bit fractional part of the multiplier is divided into four groups of 14 bits each, namely, RB2(50:63), RB2(36:49), RB2(22:35) and RB2(8:21). These four groups are connected to four inputs of a data selector 414, the output of which is connected through an encoder 415 to the input of an 8-bit RCDR register 416. The output of RCDR register 416 is connected to the 8-bit input of multiplier 402. The function and operation of encoder 415 will be understood by reference to the aforementioned U.S. Pat. No. 3,840,727.

The data path through the third input of the multiplier 402 is a long one since the multiplier 402 contains many levels of combinational logic. When the path delay through multiplier 402 is added to the path delay of the multiplicand from one of the data registers shown in FIG. 2, through data selectors 312 and 316 and along a potentially long set of wires which pass between the register complex 202 and the multiplier complex 204, the total path delay is significantly longer than one clock cycle. For example, the clock cycle may be 15 nS and the multiplicand path delay may be 22 nS. The latch points between which this path delay is calculated are, at the source end, whichever data register contains the multiplicand, and at the destination end, any of the 5 registers SR 404, CR 406, AR 408, or BR 410. However, it will be seen that the path delay is just as long if RA1 register 334 is considered to be the source latch point, or if RBLS latch 350 is considered to be the source latch point.

Prior art techniques would solve this long path problem by inserting a multiplicand register adjacent to the third input of multiplier 402. The multiplicand register would be preloaded with the multiplicand in one clock cycle, and the first multiplication would not take place until the following clock cycle. According to the invention, however, the multiplicand register is omitted. Instead, the two-cycle path delay is accommodated by the means described previously.

Before describing the operation of the apparatus of FIGS. 2 and 3 it will be useful to describe briefly the pipelined operation of the FPU 200 in general. The control unit 216 of the FPU 200 includes a control store and a control store address register. Control store is actually implemented in two modules to facilitate branching, but the invention applies equally if the more conventional one-module control store is used. A one-module control store will therefore be assumed for simplicity. Additional information on a two-module control store is available in U.S. Pat. No. 4,587,611, MULTIPLE MODULE CONTROL STORE FOR USE IN A DATA PROCESSING SYSTEM.

At the beginning of the execution of an instruction, the opcode for the instruction is loaded into the control store address register. If the instruction requires only one control word to execute, the opcode of the next instruction can be loaded into the control store address register on the following clock cycle. If the instruction invokes a multi-step algorithm, then an increment of the current address is loaded into the control store address register on the following cycle. (The reader is referred to the aforementioned U.S. Pat. No. 4,587,611 with reference to branching).

The execution of control words in the FPU 200 takes place in a pipelined fashion, each control word addressed by the control store address register being latched into the control store latches at the same time that the address of the next control word to be executed is placed in the microstore address register. The FPU can thus be considered to have a 3-stage FPU control pipeline. In the first stage, a control store address is loaded into the control store address register. In the second stage, the control word addressed by the control store address register is loaded into the control store latches. In the third stage, the control word in the control store latches is executed.

With particular reference to the detailed description of the invention, this means that if a particular microcode control word is to be executed on a particular clock cycle, the control latches are loaded with that control word on the previous clock cycle. This includes control store latches RA1 control 330, RB control 354 and WA 364. Thus, if the symbols "RA1→RA1" appear in the symbolic microcode for the first control word of a floating point multiply instruction, the value 15 is actually loaded into the RA1 control latch 330 on the previous clock cycle so that the action specified by the value 15, i.e., retaining the value in RA1 unchanged, can occur when the first control word of the multiply instruction is executed in the third stage of the FPU control pipe. Loading of RA1 control 330, RB control 354 and WA 364 therefore may well take place concurrently with the execution of the previous control word in the FPU control pipe, which may be the last control word of the previous machine level instruction.

If the FPU 200 is executing a multi-step algorithm, an Ending Next Cycle signal is issued during the execution of the next-to-last control word in algorithm. This causes the microstore address register to be loaded with the opcode of the next machine level instruction instead of with an increment of the address of the last control word in the algorithm. On the execution of the last control word in the algorithm, the first control word in the algorithm for executing the next machine level instruction is already being loaded into the control store latches.

The operation of the apparatus shown in FIGS. 2 and 3 for performing an MDR $R_1,R_2$ instruction will now be described. This is a long-format floating point multiplication between a multiplicand located in $R_1$ and a multiplier located in $R_2$, with the result to be written into $R_1$. It is assumed that $R_1$ refers to FPR2 and $R_2$ refers to FPR0, and that the multiplier was placed in FPR0 on a previous instruction. For illustration purposes, it is assumed that the multiplicand is placed in FPR2 in the instruction immediately preceding the MDR instruction. For simplicity, only the operations on the fractional part of the operands will be described. Aspects of the procedure which are omitted include exponent calculations, pre and post-normalization, maintenance of the proper sign, testing for a zero operand to force a zero result, and testing for exponent overflow and underflow. For a more detailed explanation, the reader is referred to the aforementioned U.S. patent application Ser. No. 925,997, or to the microcode implementing this instruction located in Appendix I hereto.

On the clock cycle prior to the first cycle of the multiply instruction, i.e., on the last cycle of the previous instruction (referred to herein as the setup cycle), the multiplier is already in FPR0 as previously mentioned, and the multiplicand is placed in FPR2. RA2 register 344 has already been set by the Instruction Unit (not shown) to refer to FPR0, so RB2 already contains the multiplier from FPR0. RA1 is loaded with the address of FPR2 to cause data selector 312 to select the multiplicand onto the RB1bus at the beginning of the first cycle of the multiply instruction, and RBLS is loaded with the value corresponding to long format instructions.

Additionally on this setup cycle, RB control latch 354, RA1 control latch 330 and WA latch 364, which had previously been loaded with enabling values, are now loaded with disabling values. The enabling values, which may be different for each of these control registers, are the values which cause respective gates 352, 336 and one of gates 360 to permit the rising edge of the next clock to trigger the clock input of the corresponding register RBLS, RA1 or the specified data register. As previously discussed, the enabling value for RA1 includes any value other than 15, and the enabling value for WA should be the address of FPR2. The disabling value for RA1 is 15, and the disabling value for WA latch 364 may be any value other than the address of FPR2. Unless other write operations will be performed during this multiplication, the default value of 7 is used as the disabling value for WA since that value does not enable clocking of any of the data registers.

The setup clock cycle is referred to as such because all the source latch points (FPR2, RA1 and RBLS) for the two-cycle paths leading to the registers on the output of multiplier 402 are being set up with the appropriate values to place the multiplicand on RB1. In the case of FPR2 and RA1, loading takes place on the setup clock cycle because the control word specifying such loading (i.e., the last control word of the previous instruction) is executed on that clock cycle (the third stage of the FPU control pipe). In the case of RBLS, which is a control store latch, loading takes place on the setup cycle because the first control word of the MDR instruction is then in the second stage of the FPU pipe. As previously described, the control words are loaded into the control store latches in the second stage of the FPU pipe.

Note that the setup clock cycle for different source latch points need not be the same clock cycle, for example if they have different path delays to the destination latch point. Also note that the path delay along RB2 to the RCDR register 416 is only one cycle long, and for the purposes of this multiplication does not actually require the data holding and glitch protection which are required for a two-cycle path.

On the first clock cycle of the multiply instruction, the low-order 14 bits of the multiplier (on RB2(50:63)) are encoded and written into the 8-bit RCDR register 416. At the same time, 0 is written into SR register 404 and CR register 406. In a conventional machine, the multiplicand would also be loaded into a local multiplicand register on this cycle. According to the invention, however, such a multiplicand register is omitted, and the output of FPR2, RA1 and RBLS are instead held constant and glitch-free on this cycle as previously described.

This is the first cycle for the two-cycle data path, so the information on the PS and PC outputs of multiplier 402 cannot yet be used reliably. This cycle is referred to as the interim cycle. Other useful operations nevertheless may be performed, however, such as testing the multiplier value on RB2 for zero. The multiplicand may also be tested for zero on this cycle if the logic and zero-trigger latch point used for this purpose are located close to data selector 316 in the register complex 302. As long as the RB1 path delay to the zero-trigger latch point is less than one clock cycle, there is no reason why this test must wait the same two clock cycles which are required for the multiplicand to propagate along, through multiplier 402 to the latch points in the multiplier complex 204.

Also on this cycle, the disabling values are written again into RB control latch 354, RA1 control latch 330 and WA latch 364.

The second cycle is the first cycle on which stable information is available at the inputs of the latch points connected to the output of multiplier 402. By this time, PS and PC outputs contain the result of the first multiply. Thus, on this cycle, PS is loaded into SR register 404 and AR register 408, and PC is loaded into CR register 406 and BR register 410. Additionally, the fifth higher-order 14 bits of the multiplier (RB2(36:49)) are written into RCDR register 416. Once again, disabling values are loaded into RB control latch 354, RA1 control latch 330 and WA latch 364.

In the third clock cycle, the results of the second multiply are available at the PS and PC outputs of multiplier 402. PS is therefore loaded into SR register 404 and AR register 408, and PC is loaded into CR register 406 and BR register 410. Also on this clock cycle the low-order 14 bits of the final product are available as the low-order bits of the output of adder 412. These are loaded into bits 56–69 of accumulator 420. The next higher-order 14 bits of the multiplier (RB2(22:35)) are also loaded in encoded form into RCDR register 416.

As previously mentioned, the RB2 path ending in RCDR register 416 is not a two-cycle path, so that glitch-free maintenance of the output of RA2 register 344 is not essential. Since the final 14 bits of the multiplier will go through the encoder and then be written into RCDR register 416 on the next cycle (cycle 4), the disabling values are once again written into RB control latch 354, RA1 control latch 330 and WA latch 364.

On the fourth cycle, the results of the third multiply are available. The PS output of multiplier 402 is therefore written into SR register 404 and AR register 408. The PC output of multiplier 402 is written into CR register 406 and BR register 410. The accumulator register 420 is also clocked, thereby shifting the previous contents of the accumulator register 420 to the right by 14 bits and pulling in the second 14-bit group of product bits from the low-order 14 bits of the adder 412 output (bits 56–69 of the adder). The highest-order 14 bits of the multiplier (RB2(8:21)) are also written (in encoded form) into RCDR register 416.

On the fifth cycle, enabling values can now be written into RB control latch 354, RA1 control latch 330 and WA latch 364, because RB1 can be released for other purposes after the fifth clock cycle (cycle 6). Note that should enabling values be written into these latch points on the previous clock cycle (cycle 4), and the value on RB1 changed on this fifth clock cycle, the new contents which would be placed on RB1 may not reach the latch points in the multiplier complex until well after the fifth clock cycle (i.e., in time for cycle 6). However, as previously mentioned, it is desirable that the data processing system operate just as reliably at slow clock frequencies as it does at the maximum rated clock frequency. If the clock frequency is slowed sufficiently, and a new value is placed on the RB1bus on the fourth clock cycle, then the new value may reach the latch points in the multiplier unit 204 early enough to change the data inputs of such latch points prior to the fifth clock cycle. As will be seen, the fifth clock cycle is still occupied in calculating the results of the fourth multiply, so an erroneous result will be obtained. Waiting until after the fifth clock cycle to release RB1 (which permits placing enabling values in the gating latches controlling the source latch points on this fifth clock cycle) avoids this problem.

Also on the fifth clock cycle, the results of the fourth multiply are available and are written into SR register 404, CR register 406, AR register 408 and BR register 410 as previously described. The previous contents of accumulator register 420 are shifted to the right by 14 bits, and the entire 70-bit output of adder 412 is loaded into the high-order 70 bits of accumulator register 420. It will be assumed that the final product is to be placed into data register FPR0, so the address of that data register is now placed in WA latch 364. RB1 can now be made available for other purposes after this cycle, as previously explained, since this is the final cycle on which data originating from FPR2 is needed. New values may therefore be loaded into RBLS register 350 and RA1 register 334 at this point as well.

On the sixth clock cycle, the 116-bit output of accumulator 420 will pass through PN shifter 421 and data selector 310 for writing back into the register complex.

It can be seen that the multiplier complex 204 performs its function accurately, without the need for an additional multiplicand register. Additionally, it will be noted that the results will continue to be accurate even if the clock frequency is slowed, since the value on RB1 remains constant and glitch-free, even at the source end of the data paths leading to the multiplier complex 204, until after the final clock cycle on which the multiplicand is needed.

In a floating point divider complex, a dedicated local divisor register may be omitted in the same manner as the dedicate local multiplicand register is omitted in the floating point multiplier complex. The divider complex 208 is shown in more detail in FIG. 4. It comprises combinational divide logic 510, having a divisor input, a PD input and a PB input, and having a Q output, a PD output and an RB output. The divisor input is coupled to the RB2 bus in the same way that the multiplicand input of multiplier 402 (FIG. 3) is coupled to the RB1bus. The PD input of divide logic 510 is coupled to the output of a 60-bit PD register 512, and the PB input of divide logic 510 is coupled to the output of a 60-bit PB register 514. The input of PD register 512 is coupled to the output of a data selector 516 which can select data from either the output of PD register 512, the output of a shifter 518 or the PD output of divide logic 510. The input of PB register 514 is coupled to the output of a data selector 520 which can select data from either the output of PB register 514, the PB output of divide logic 510, or a word of all zeros. The shifter 518 has its input coupled to the RB1bus, and is capable only of performing shifts by 0, 2 or 4 bits. The Q output of divide logic 510 is coupled to a $Q_{01}$ bus and also to the input of a 3-bit QBITS register 522.

The operation of divider complex 208 is described in the aforementioned U.S. Patent application Ser. No. 907,060, SAVING CYCLES IN FLOATING POINT DIVISION. The operation of divider complex 208 may be understood in still greater detail by referring to the microcode for executing a floating point divide long instruction, set out in Appendix II hereto. Only a brief description of the operation is therefore presented herein.

The divider complex 208 operates iteratively to generate sequential quotient bits on the Q output of divide logic 510 based on a dividend previously made available on RB1 and a divisor made available on RB2. The data path from the data register containing the dividend, through data selectors 312 and 316 (FIG. 2), shifter 518 (FIG. 4) and data selector 516 to the PD register 512 is a conventional one-cycle path and requires no special consideration. The same is true with the path from PD and PB registers 512 and 514, through divide logic 510 and data selectors 516 and 520, and back to PD and PB register 512 and 514. The data path from the data register containing the divisor, through data selectors 314 and 318 (FIG. 2), divide logic 510 (FIG. 4) and data selectors 516 and 520 to PD and PB registers 512 and 514, however, is a two-cycle path. Likewise, the paths from RA2 register 344 and RBLS latch 350 (FIG. 2) to PD and PB registers 512 and 514 also may require more than one cycle to complete.

As with the multiplier complex 204, prior art techniques would solve the long path problem by inserting a dedicated divisor register adjacent to the divisor input of divide logic 510. The divisor register would be preloaded with the divisor on one clock cycle (possibly the same clock cycle as the loading of PD register 512 with dividend information), and the first divide would not take place until the following clock cycle. According to the invention, however, the dedicated divisor register is omitted. Instead, the two-cycle path delays are accommodated by the means described previously.

The implementation of the divide algorithm illustrates a variation of the multiplier embodiment. Referring to the microcode in Appendices I and II, it can be seen that whereas the first multiply takes place on the second cycle of the multiply instruction, the first divide does not take place until the third cycle of the divide instruction. Loading of the appropriate data register with the divisor and the RA2 register 344 with the address of the divisor data register both take place on the first cycle of the divide instruction. This is similar to the multiply instruction, in that the setup cycle for these two source latch points occurs two cycles before data affected by these latch points is latched into the destination latch points PD and PB registers 512 and 514. Loading of the RBLS latch 350, however, continues to occur on the last clock cycle of the previous instruction (when the first control word of the divide algorithm is in the second stage of the FPU control pipe as described above). The setup cycle for RBLS latch 350 as a source latch point is therefore three cycles before data affected by RBLS latch 350 is latched into the destination latch points PD and PB register 512 and 514. Only a 2-cycle advance is necessary.

The implementation of the divide algorithm illustrates not only that different source latch points affecting the same destination latch point may have different setup cycles, but also that the setup cycle for a source latch point may occur earlier than absolutely necessary if convenient or desirable for other purposes. However, the data at the output of the source latch point must still remain constant and glitch-free from two cycles before the first cycle on which data affected by the source latch point is latched into the destination latch points, through the final cycle on which data affected by the source latch point is latched into the destination latch points.

The invention has been described with respect to particular embodiments thereof, and it will be understood that numerous variations are possible. For example, the means for avoiding glitches in the output of a latch point might be accomplished inherently by the design of the latch point, in which case no clock gating is needed. Additionally, although the WA Register 364 in FIG. 2 performs the gating control function for clock gates 360 in order to prevent glitches on the output of the data register which contains the multiplicand, it will be understood that other gating control means may be used instead. Another example is that the output of comparator 338 may be used to control the gating of one or more of the data registers, in addition to controlling the gating of RA1 Register 334. As another example, the gating control signals shown in the figures as latch points RA1 control, RB control and WA, may instead be generated combinatorially, including by direct connection to the output of an appropriate field in microstore. As another example, though the invention has been described with respect to an FPU, it may be used in many other functional units of a computer. These and many other variations are within the scope of the invention.

APPENDIX I

COPYRIGHT 1986 AMDAHL CORPORATION

```
7017 |
7018 |
7019 |/* MULTIPLY LONG                                                        */
7020 |/*                                                                      */
7021 |/* MNEMONICS:  MDR, MD                                                  */
7022 |/* OP CODE:    2C, 6C                                                   */
7023 |/* FORMAT:     RR, RX                                                   */
7024 |/* OPERATION:  THE NORMALIZED PRODUCT OF THE SECOND OPERAND (THE        */
7025 |/*     MULTIPLIER) AND THE FIRST OPERAND (THE MULTIPLICAND) IS PLACED  */
7026 |/*     IN THE FIRST OPERAND LOCATION.                                   */
7027 |/*                                                                      */
7028 |/*     MULTIPLICATION OF TWO FLOATING-POINT NUMBERS CONSISTS OF         */
7029 |/*     EXPONENT ADDITION AND FRACTION MULTIPLICATION.                   */
7030 |/*                                                                      */
7031 |/*     WHEN EITHER OR BOTH OPERAND FRACTIONS ARE ZERO, THE RESULT IS    */
7032 |/*     MADE A TRUE ZERO, AND NO EXPONENT OVERFLOW OR EXPONENT           */
7033 |/*     UNDERFLOW OCCURS.                                                */
7034 |/*                                                                      */
7035 |/*     THE SIGN OF THE PRODUCT IS DETERMINED BY THE RULES OF ALGEBRA,   */
7036 |/*     EXCEPT THAT THE SIGN IS ALWAYS ZERO WHEN THE RESULT IS MADE A    */
7037 |/*     TRUE ZERO.                                                       */
7038 |/*                                                                      */
7039 |/* CONDITION CODE:  UNCHANGED                                           */
7040 |/*                                                                      */
7041 |/* INTERRUPTIONS REPORTED BY F-UNIT:  EXPONENT OVERFLOW                 */
7042 |/*                                    EXPONENT UNDERFLOW                */
7043 |/*                                                                      */
7044 |/* PIPELINE SEQUENCE:   D A B X - - - X W                               */
7045 |/*     (ONLY ONE SEQUENCE IS NEEDED BECAUSE OPERAND 1 IS READ FROM      */
7046 |/*              AND WRITTEN TO A REGISTER ON THE F-UNIT)                */
7047 |/*                                                                      */
7048 |/* CONTROL-STORE REQUIREMENT:    FCSA = 8                               */
7049 |/*                               FCSB = 15                              */
7050 |/*                               --------                               */
7051 |/*                               TOTAL FCS = 23                         */
7052 |/*                                                                      */
7053 |/* TIMING: ON AVERAGE, CYCLE COUNT < 6.3 CYCLES                         */
7054 |/*         4 CYCLES IF OP2 = 0                                          */
7055 |/*         6 CYCLES IF OP1 = 0 AND OP2 ¬= 0                             */
7056 |/*         6 CYCLES IF IT CAN BE PREDICTED THAT POSTNORMALIZATION       */
7057 |/*                   CAN BE BYPASSED (MOST LIKELY CASE)                 */
7058 |/*         7 CYCLES IF BOTH OPS ARE NORMAL, IT CANNOT BE PREDICTED      */
7059 |/*                   THAT POSTNORMALIZATION CAN BE BYPASSED,            */
7060 |/*                   BUT IT CAN BE PREDICTED THAT THERE WILL            */
7061 |/*                   BE NO EXPONENT OVERFLOW OR UNDERFLOW               */
7062 |/*                   (2ND MOST LIKELY CASE)                             */
7063 |/*         8 CYCLES IF BOTH OPS ARE NORMAL, IT CANNOT BE PREDICTED      */
7064 |/*                   THAT POSTNORMALIZATION CAN BE BYPASSED,            */
7065 |/*                   AND IT CANNOT BE PREDICTED THAT THERE WILL         */
7066 |/*                   BE NO EXPONENT OVERFLOW OR UNDERFLOW               */
7067 |/*         10 - 11 CYCLES IF EITHER OP NOT NORMAL BUT PRODUCT NOT ZERO  */
7068 |
7069 |
7070 |
7071 |/* FLOW:                                                                 */
7072 |/*                                    OP2=0                              */
7073 |/*    MDR ----> $2B ---------------------------------> $40A              */
7074 |/*              |                                                        */
7075 |/*              |    EITHER OP                                           */
7076 |/*              |    NOT NORMAL       OP1=0           V                  */
7077 |/*    +<------ $4B ----------> $21A ------> $40B ---> $41B               */
7078 |/*    |         |                                     (FINIS)            */
7079 |/*    |         |                                                        */
7080 |/*    |         V                                                        */
7081 |/*    |        $22A -----------> $24B --> $25B                           */
7082 |/*    |                                    |                             */
7083 |/*    |                                    |                             */
7084 |/*    |                                    V                             */
7085 |/*    |                          $28B <-- $27B <-- $26B                  */
7086 |/*    |               POSSIBLE  (FINIS)    ^                             */
7087 |/*    |    PRODUCT    EXO OR EXU           |                             */
7088 |/*    V    NOT NORMAL EXCEPTION            |         V                   */
```

```
7089  /*    $5B --------> $10A --------> $14B         +<---- $30A       */
7090  /*     |             |             |                              */
7091  /*     |             |             |                              */
7092  /*     v             v             v                              */
7093  /*    $6B           $11A          $15B                            */
7094  /*     |             |             |                              */
7095  /*     |             |             |                              */
7096  /*     v             v             v                              */
7097  /*    $7B           $12A          $16B                            */
7098  /* (FINIS)         (FINIS)       (FINIS)                          */
7100
7101
7102  BEGIN MD;
7103
7104  CSECT FCSA0;   ORIGIN '1E'X;
7105
7106  MDR:  LONG_OPERAND -> RB1,
7107        LONG_OPERAND -> RB2,
7108        (0/(0..55),RB2(8..21)/(56..69)) -> ACC,
7109        RB2(22..67) -> UM,
7110        RB2(50..63) -> RCDR,
7111        (RB1(1..7) + RB2(1..7)) -> EXPONENT_CALCULATION,
7112        EXPONENT_CALCULATION -> EXPR,
7113        RB1(0) XOR RB2(0) -> SIGN,
7114        SIGN -> SIGN_TRIGGER,
7115        RA1 -> RA1,    /* HOLD RB1 FOR MULTIPLICAND */
7116        HOLD_NEXT_CYCLE -> RB_CONTROL,
7117        RB1(8..67) -> WRITE_BUS_FRACTION,
7118        TPR2 -> WRITE_ADDRESS,   /* SAVE OP1 FRACTION IN TPR2 */
7119        0 -> SUBTRACT_OPERATION,
7120        SUBTRACT_OPERATION -> SUBTRACT_TRIGGER,
7121        0 -> SR,
7122        0 -> CR,
7123        (0/(0..1),RB1(8..63)/(2..57),0/(58..59)) -> PD,
7124        0 -> PB,       /* LOAD PD AND PB FOR RESIDUE CHECKING */
7125        (RB1(8..11) ¬= 0) -> OP1_NORMAL_TRIGGER,
7126        (RB2(8..11) ¬= 0) -> OP2_NORMAL_TRIGGER,
7127        (RB1(8..11)*RB2(8..11) > 'F'X) -> PRODUCT_NORMAL_TRIGGER,
7128        (RB2(8..67)=0) -> ZERO_TEST,
7129        ZERO_TEST -> ZERO_TRIGGER,
7130        1 -> TEST_DATA_VALID,
7131        1 -> BRANCH,
7132        $2B -> ADDRESS;
7133
7134  CSECT FCSB;
7135
7136  $2B:  LONG_OPERAND -> RB1,
7137        PS -> SR,
7138        PC -> CR,                /* 1ST MULTIPLY */
7139        PS -> AR,
7140        PC -> BR,
7141        UM(84..97) -> RCDR,
7142        0 -> CARRY_TRIGGER,
7143        0 -> ACC,
7144        (ACC(56..69)/(70..83),UM(70..101)/(84..115)) -> UM,
7145        EXPR - '40'X -> EXPONENT_CALCULATION,
7146        EXPONENT_CALCULATION -> EXPR,
7147        RA1 -> RA1,
7148      . TPR2 -> RA2,
7149        HOLD_NEXT_CYCLE -> RB_CONTROL,
7150        0 -> CHECK_RB2_PARITY,
7151        ZERO_TRIGGER -> BRANCH,   /* BRANCH IF OP2 = 0 */
7152        $40A -> ADDRESS;
7154
7155
7156  CSECT FCSB;
7157
7158  $4B:  LONG_OPERAND -> RB1,
7159        PS -> SR,
7160        PC -> CR,                /* 2ND MULTIPLY */
7161        PS -> AR,
7162        PC -> BR,
7163        UM(84..97) -> RCDR,
7164        INHIBIT RECOMPLEMENT -> AA OPERATION,
```

```
7165            CARRY_TRIGGER_69 -> AA_CARRY_IN.
7166            AA_SUM -> ACC.
7167            CARRY_OUT_FROM_AA(56) -> CARRY_TRIGGER.
7168            (ACC(56..69)/(70..83),UM(70..101)/(84..115)) -> UM.
7169            LONG_OPERAND -> RB2.
7170            (RB2(8..67)=0) -> ZERO_TEST.
7171            ZERO_TEST -> ZERO_TRIGGER.
7172            RA1 -> RA1.
7173            HOLD_NEXT_CYCLE -> RB_CONTROL.
7174            ¬OP1_NORMAL_TRIGGER | ¬OP2_NORMAL_TRIGGER -> BRANCH.
7175            $21A -> ADDRESS;
7176
7177    $5B:    LONG_OPERAND -> RB1.
7178            PS -> SR.
7179            PC -> CR.                    /* 3RD MULTIPLY */
7180            PS -> AR.
7181            PC -> BR.
7182            UM(84..97) -> RCDR.
7183            INHIBIT_RECOMPLEMENT -> AA_OPERATION.
7184            CARRY_TRIGGER_69 -> AA_CARRY_IN.
7185            AA_SUM -> ACC.
7186            CARRY_OUT_FROM_AA(56) -> CARRY_TRIGGER.
7187            (ACC(56..69)/(70..83),UM(70..101)/(84..115)) -> UM.
7188            0 -> CHECK_RB2_PARITY.
7189            RA1 -> RA1.
7190            HOLD_NEXT_CYCLE -> RB_CONTROL.
7191            ¬PRODUCT_NORMAL_TRIGGER -> BRANCH.
7192            $10A -> ADDRESS;
7194
7195
7196    CSECT FCSB:
7197
7198    $6B     LONG_OPERAND -> RB1.
7199            PS -> SR.
7200            PC -> CR.                    /* 4TH MULTIPLY */
7201            PS -> AR.
7202            PC -> BR.
7203            UM(84..97) -> RCDR.
7204            INHIBIT_RECOMPLEMENT -> AA_OPERATION.
7205            CARRY_TRIGGER_69 -> AA_CARRY_IN.
7206            AA_SUM -> ACC.
7207            CARRY_OUT_FROM_AA(56) -> CARRY_TRIGGER.
7208            (ACC(56..69)/(70..83),UM(70..101)/(84..115)) -> UM.
7209            0 -> CHECK_RB2_PARITY.
7210            1 -> ENDING_NEXT_CYCLE;
7211
7212    $7B:    SIGN_TRIGGER -> SIGN.
7213            0 -> ZERO_TEST.
7214            SIGN & ¬ZERO_TEST & (EXU_MASK | ¬EXPR(-1)) -> WRITE_BUS_SIGN.
7215            IF (ZERO_TEST | (EXPR(-1) & ¬EXU_MASK)) THEN 0
7216                        ELSE EXPR(1..7) ENDF -> WRITE_BUS_EXP.
7217            IF (ZERO_TEST | (EXPR(-1) & ¬EXU_MASK)) THEN 0
7218                ELSE AA_SUM(0..59) ENDF -> WRITE_BUS_FRACTION.
7219            OP1AR -> WRITE_ADDRESS.
7220            LONG -> WRITE_LENGTH.
7221            1 -> RESET_RETRY_POINT.
7222            INHIBIT_RECOMPLEMENT -> AA_OPERATION.
7223            CARRY_TRIGGER_69 -> AA_CARRY_IN.
7224            AA_SUM -> ACC.       /* NECESSARY FOR RESIDUE CHECKING */
7225            0 -> UM.
7226            EXPR(0) & ¬EXPR(-1) -> EXO_INTERRUPT.
7227            EXPR(-1) & EXU_MASK & ¬ZERO_TEST -> EXU_INTERRUPT.
7228            0 -> CHECK_RB2_PARITY.
7229            R1 -> OP1AR.
7230            R2 -> OP2AR.
7231            R1 -> RA1.
7232            R2 -> RA2.
7233            0 -> SAR.
7234            1 -> LAST_X_CYCLE.
7235            1 -> BRANCH.
7236            IDLE_LOOP_A -> ADDRESS;
7238
7239
```

```
7240  CSECT FCSA1:
7241
7242  $10A: LONG_OPERAND -> RB1,
7243        PS -> SR,
7244        PC -> CR,                        /* 4TH MULTIPLY */
7245        PS -> AR,
7246        PC -> BR,
7247        UM(84..97) -> RCDR,
7248        INHIBIT_RECOMPLEMENT -> AA_OPERATION,
7249        CARRY_TRIGGER_69 -> AA_CARRY_IN,
7250        AA_SUM -> ACC,
7251        CARRY_OUT_FROM_AA(56) -> CARRY_TRIGGER,
7252        (ACC(56..69)/(70..83),UM(70..101)/(84..115)) -> UM,
7253        0 -> CHECK_RB2_PARITY,
7254        (EXPR < '10'X) | EXPR(0) -> BRANCH,
7255        $14B -> ADDRESS;    /* NOTE: EXPR(-1) => EXPR(0) */
7256
7257  $11A: CARRY_TRIGGER_69 -> AA_CARRY_IN,
7258        INHIBIT_RECOMPLEMENT -> AA_OPERATION,
7259        AA_SUM -> ACC,
7260        0 -> CARRY_TRIGGER,
7261        (ACC(56..69)/(70..83),UM(70..101)/(84..115)) -> UM,
7262        0 -> CHECK_RB2_PARITY,
7263        1 -> ENDING_NEXT_CYCLE;
7264
7265  $12A  SIGN_TRIGGER -> SIGN,
7266        0 -> ZERO_TEST,
7267        SIGN & ¬ZERO_TEST & (EXU_MASK | ¬EXPR(-1)) -> WRITE_BUS_SIGN,
7268        IF (ZERO_TEST | (EXPR(-1) & ¬EXU_MASK)) THEN 0
7269             ELSE EXPONENT_CALCULATION(1..7) ENDF -> WRITE_BUS_EXP,
7270        IF (ZERO_TEST | (EXPR(-1) & ¬EXU_MASK)) THEN 0
7271             ELSE PN_SHIFTER ENDF -> WRITE_BUS_FRACTION,
7272        IF CARRY_TRIGGER THEN RIGHT 1 ELSE LEFT LEADING_ZERO_DIGIT_COUNT
7273                                    ENDF -> NORMALIZE_SHIFT_AMOUNT,
7274        LEADING_ZERO_DIGIT_COUNT -> NORMALIZE_COUNT,
7275        IF CARRY_TRIGGER THEN EXPR + 1 ELSE EXPR - NORMALIZE_COUNT ENDF
7276                                    -> EXPONENT_CALCULATION,
7277        OP1AR -> WRITE_ADDRESS,
7278        LONG -> WRITE_LENGTH,
7279        1 -> RESET_RETRY_POINT,
7280        0 -> CHECK_RB2_PARITY,
7281        R1 -> OP1AR,
7282        R2 -> OP2AR,
7283        R1 -> RA1,
7284        R2 -> RA2,
7285        0 -> SAR,
7286        1 -> LAST_X_CYCLE,
7287        1 -> BRANCH,
7288        IDLE_LOOP_B -> ADDRESS;
7290
7291
7292  CSECT FCSB:
7293
7294  $14B  AA_SUM -> ACC,
7295        0 -> CHECK_RB2_PARITY,
7296        INHIBIT_RECOMPLEMENT -> AA_OPERATION,
7297        CARRY_TRIGGER_69 -> AA_CARRY_IN,
7298        0 -> CARRY_TRIGGER,
7299        (ACC(56..69)/(70..83),UM(70..101)/(84..115)) -> UM;
7300
7301  $15B  EXPONENT_CALCULATION -> EXPR,
7302        IF CARRY_TRIGGER THEN EXPR + 1 ELSE EXPR - NORMALIZE_COUNT ENDF
7303                                    -> EXPONENT_CALCULATION,
7304        LEADING_ZERO_DIGIT_COUNT -> NORMALIZE_COUNT,
7305        HOLD -> SUM_ZERO_DIGIT_TEST,
7306        0 -> CHECK_RB2_PARITY,
7307        1 -> ENDING_NEXT_CYCLE;
7308
7309  $16B: SIGN_TRIGGER -> SIGN,
7310        0 -> ZERO_TEST,
7311        SIGN & ¬ZERO_TEST & (EXU_MASK | ¬EXPR(-1)) -> WRITE_BUS_SIGN,
7312        IF (ZERO_TEST | (EXPR(-1) & ¬EXU_MASK)) THEN 0
7313                    ELSE EXPR(1..7) ENDF -> WRITE_BUS_EXP,
7314        IF (ZERO_TEST | (EXPR(-1) & ¬EXU_MASK)) THEN 0
```

```
7315            ELSE PN_SHIFTER ENDF -> WRITE_BUS_FRACTION,
7316       IF CARRY_TRIGGER THEN RIGHT 1 ELSE LEFT LEADING_ZERO_DIGIT_COUNT
7317                               ENDF -> NORMALIZE_SHIFT_AMOUNT,
7318       OP1AR -> WRITE_ADDRESS,
7319       LONG -> WRITE_LENGTH,
7320       1 -> RESET_RETRY_POINT,
7321       EXPR(0) & ¬EXPR(-1) -> EXO_INTERRUPT,
7322       EXPR(-1) & EXU_MASK & ¬ZERO_TEST -> EXU_INTERRUPT,
7323       0 -> CHECK_RB2_PARITY,
7324       R1 -> OP1AR,
7325       R2 -> OP2AR,
7326       R1 -> RA1,
7327       R2 -> RA2,
7328       0 -> SAR,
7329       1 -> LAST_X_CYCLE,
7330       1 -> BRANCH,
7331       IDLE_LOOP_A -> ADDRESS;

CSECT FCSA1;

$21A  LONG_OPERAND -> RB1,
      PS -> SR,
      PC -> CR,                  /* 3RD MULTIPLY */
      PS -> AR,
      PC -> BR,
      UM(84..97) -> RCDR,
      INHIBIT_RECOMPLEMENT -> AA_OPERATION,
      CARRY_TRIGGER_69 -> AA_CARRY_IN,
      AA_SUM -> ACC,
      CARRY_OUT_FROM_AA(56) -> CARRY_TRIGGER,
      (ACC(56..69)/(70..83),UM(70..101)/(84..115)) -> UM,
      0 -> CHECK_RB2_PARITY,
      RA1 -> RA1,
      HOLD_NEXT_CYCLE -> RB_CONTROL,
      ZERO_TRIGGER -> BRANCH,
      $40B -> ADDRESS;

$22A  LONG_OPERAND -> RB1,
      PS -> SR,
      PC -> CR,                  /* 4TH MULTIPLY */
      PS -> AR,
      PC -> BR,
      UM(84..97) -> RCDR,
      INHIBIT_RECOMPLEMENT -> AA_OPERATION,
      CARRY_TRIGGER_69 -> AA_CARRY_IN,
      AA_SUM -> ACC,
      CARRY_OUT_FROM_AA(56) -> CARRY_TRIGGER,
      (ACC(56..69)/(70..83),UM(70..101)/(84..115)) -> UM,
      0 -> CHECK_RB2_PARITY,
      1 -> BRANCH,
      $24B -> ADDRESS;

CSECT FCSB;

$24B  AA_SUM -> ACC,
      0 -> CHECK_RB2_PARITY,
      INHIBIT_RECOMPLEMENT -> AA_OPERATION,
      CARRY_TRIGGER_69 -> AA_CARRY_IN,
      0 -> CARRY_TRIGGER,
      SUM(0..59) -> NEXT_CYCLE_ZERO_TEST,
      (ACC(56..69)/(70..83),UM(70..101)/(84..115)) -> UM;

$25B  PN_SHIFTER -> WRITE_BUS_FRACTION,
      14 -> NORMALIZE_SHIFT_AMOUNT,
      TPR4 -> WRITE_ADDRESS,
      LONG -> WRITE_LENGTH,
      0 -> CHECK_RB2_PARITY,
      (PREV_CYCLE_SUM = 0) -> ZERO_TEST,
      ZERO_TEST -> ZERO_TRIGGER,
      HOLD -> SUM_ZERO_DIGIT_TEST,
      TPR4 -> RA1;
```

```
7390
7391    $26B: LONG_OPERAND -> RB1,
7392         RB1(8..63) -> X_BUS,
7393         (X_BUS/(0..55),0/(56..69)) -> AR,
7394         0 -> BR,
7395         0 -> CHECK_XY_BUS_PARITY,
7396         HOLD_NEXT_CYCLE -> RB_CONTROL,
7397         RA1 -> RA1,
7398         ACC -> ACC,
7399         UM -> UM,
7400         0 -> CARRY_TRIGGER,
7401         HOLD -> SUM_ZERO_DIGIT_TEST,
7402         0 -> CHECK_RB2_PARITY,
7403         ZERO_TRIGGER -> BRANCH,
7404         $30A -> ADDRESS;
7405
7406
7407
7408    CSECT FCSB;
7409
7410    $27B: EXPONENT_CALCULATION -> EXPR,
7411         LEADING_ZERO_DIGIT_COUNT -> NORMALIZE_COUNT,
7412         IF CARRY_TRIGGER THEN EXPR + 1 ELSE EXPR - NORMALIZE_COUNT ENDF
7413                                                    -> EXPONENT_CALCULATION,
7414         ACC -> ACC,
7415         UM -> UM,
7416         HOLD -> SUM_ZERO_DIGIT_TEST,
7417         0 -> CHECK_RB2_PARITY,
7418         1 -> ENDING_NEXT_CYCLE;
7419
7420    $28B: SIGN_TRIGGER -> SIGN,
7421         0 -> ZERO_TEST,
7422         SIGN & ¬ZERO_TEST & (EXU_MASK | ¬EXPR(-1)) -> WRITE_BUS_SIGN,
7423         IF (ZERO_TEST | (EXPR(-1) & ¬EXU_MASK)) THEN 0
7424                      ELSE EXPR(1..7) ENDF -> WRITE_BUS_EXP,
7425         IF (ZERO_TEST | (EXPR(-1) & ¬EXU_MASK)) THEN 0
7426            ELSE PN_SHIFTER ENDF -> WRITE_BUS_FRACTION,
7427         IF CARRY_TRIGGER THEN RIGHT 1 ELSE LEFT LEADING_ZERO_DIGIT_COUNT
7428                                   ENDF -> NORMALIZE_SHIFT_AMOUNT,
7429         OP1AR -> WRITE_ADDRESS,
7430         LONG -> WRITE_LENGTH,
7431         1 -> RESET_RETRY_POINT,
7432         EXPR(0) & ¬EXPR(-1) -> EXO_INTERRUPT,
7433         EXPR(-1) & EXU_MASK & ¬ZERO_TEST -> EXU_INTERRUPT,
7434         0 -> CHECK_RB2_PARITY,
7435         R1 -> OP1AR,
7436         R2 -> OP2AR,
7437         R1 -> RA1,
7438         R2 -> RA2,
7439         0 -> SAR,
7440         1 -> LAST_X_CYCLE,
7441         1 -> BRANCH,
7442         IDLE_LOOP_A -> ADDRESS;
7443
7444
7445
7446    CSECT FCSA1;
7447
7448    $30A  AA_SUM -> ACC,
7449         0 -> UM,
7450         0 -> CARRY_TRIGGER,
7451         14 -> NORMALIZE_COUNT,
7452         EXPR - NORMALIZE_COUNT -> EXPONENT_CALCULATION,
7453         EXPONENT_CALCULATION -> EXPR,
7454         0 -> CHECK_RB2_PARITY,
7455         LONG_OPERAND -> RB1,    /* RELOAD AR TO CHECK X_BUS PARITY */
7456         RB1(8..63) -> X_BUS,
7457         (X_BUS/(0..55),0/(56..69)) -> AR,
7458         0 -> BR,
7459         1 -> BRANCH,
7460         $27B -> ADDRESS;
7461
7462
7463
7464    CSECT FCSA1;
7465
```

```
7466    $40A  0 -> CHECK_RB2_PARITY,
7467          1 -> ENDING_NEXT_CYCLE,
7468          1 -> BRANCH,
7469          $418 -> ADDRESS;
7470
7471    CSECT FCSB:
7472
7473    $40B  0 -> CHECK_RB2_PARITY,
7474          1 -> ENDING_NEXT_CYCLE;
7475
7476    $418: 0 -> SIGN,
7477          SIGN -> SIGN_TRIGGER,     /* IRRELEVANT, BUT PART OF PATTERN */
7478          1 -> ZERO_TEST,
7479          SIGN & ¬ZERO_TEST & (EXU_MASK | ¬EXPR(-1)) -> WRITE_BUS_SIGN,
7480          IF (ZERO_TEST | (EXPR(-1) & ¬EXU_MASK)) THEN 0
7481                      ELSE EXPR(1..7) ENDF -> WRITE_BUS_EXP,
7482          IF (ZERO_TEST | (EXPR(-1) & ¬EXU_MASK)) THEN 0
7483              ELSE PN_SHIFTER ENDF -> WRITE_BUS_FRACTION,
7484          OP1AR -> WRITE_ADDRESS,
7485          LONG -> WRITE_LENGTH,
7486          1 -> RESET_RETRY_POINT,
7487          0 -> CHECK_RB2_PARITY,
7488          R1 -> OP1AR,
7489          R2 -> OP2AR,
7490          R1 -> RA1,
7491          R2 -> RA2,
7492          0 -> SAR,
7493          1 -> LAST_X_CYCLE,
7494          1 -> BRANCH,
7495          IDLE_LOOP_A -> ADDRESS;
7496
7497    ENDB MD;
```

APPENDIX II

COPYRIGHT 1986 AMDAHL CORPORATION

```
4331
4332
4333    /* DIVIDE LONG                                                            */
4334    /*                                                                        */
4335    /* MNEMONICS   DDR, DD                                                    */
4336    /* OP CODE     2D, 6D                                                    */
4337    /* FORMAT      RR, RX                                                    */
4338    /* OPERATION:  THE FIRST OPERAND (THE DIVIDEND) IS DIVIDED BY THE         */
4339    /*     SECOND OPERAND (THE DIVISOR), AND THE NORMALIZED QUOTIENT IS      */
4340    /*     PLACED IN THE FIRST-OPERAND LOCATION.  NO REMAINDER IS            */
4341    /*     PRESERVED.                                                        */
4342    /*                                                                        */
4343    /*     ALL DIVIDEND AND DIVISOR FRACTION DIGITS PARTICIPATE IN            */
4344    /*     FORMING THE FRACTION OF THE INTERMEDIATE QUOTIENT.                */
4345    /*                                                                        */
4346    /*     WHEN THE DIVISOR FRACTION IS ZERO, A FLOATING-POINT-DIVIDE         */
4347    /*     EXCEPTION IS RECOGNIZED, AND THE OPERATION IS SUPPRESSED.          */
4348    /*     THIS INCLUDES THE CASE OF DIVISION OF ZERO BY ZERO.               */
4349    /*                                                                        */
4350    /*     WHEN THE DIVIDEND FRACTION IS ZERO, BUT THE DIVISOR FRACTION       */
4351    /*     IS NONZERO, THE QUOTIENT IS MADE A TRUE ZERO, AND NO EXPONENT     */
4352    /*     OVERFLOW OR EXPONENT UNDERFLOW OCCURS.                            */
4353    /*                                                                        */
4354    /*     THE SIGN OF THE PRODUCT IS DETERMINED BY THE RULES OF ALGEBRA,     */
4355    /*     EXCEPT THAT THE SIGN IS ALWAYS ZERO WHEN THE RESULT IS MADE A      */
4356    /*     TRUE ZERO.                                                         */
4357    /*                                                                        */
4358    /* CONDITION CODE:  UNCHANGED                                             */
4359    /*                                                                        */
4360    /* INTERRUPTIONS REPORTED BY F-UNIT:  EXPONENT OVERFLOW                   */
4361    /*                                    EXPONENT UNDERFLOW                  */
4362    /*                                    FLOATING-POINT DIVIDE               */
4363    /*                                                                        */
4364    /* PIPELINE SEQUENCE:   D A B X - - - X W                                 */
4365    /*     (ONLY ONE SEQUENCE IS NEEDED BECAUSE OPERAND 1 IS READ FROM        */
4366    /*                AND WRITTEN TO A REGISTER ON THE F-UNIT)                */
```

```
4367  /*
4368  /* CONTROL-STORE REQUIREMENT:    FCSA = 8                        */
4369  /*                               FCSB = 13                       */
4370  /*                               ---------                       */
4371  /*                               TOTAL FCS = 21                  */
4372  /*                                                               */
4373  /* TIMING   30.64 (AVERAGE) CYCLES IF BOTH OPS NORMAL            */
4374  /*          6 CYCLES (PLUS INTERRUPT TIME) IF OP2 = 0            */
4375  /*          8 CYCLES IF OP1 = 0 AND OP2 ¬= 0                     */
4376  /*          36.64 (AVERAGE) CYCLES IF EITHER OP NOT NORMAL AND   */
4377  /*                  BOTH OPS NOT ZERO                            */
4378
4379
4380
4381  /* FLOW                                                           */
4382  /*                                                                */
4383  /*   $1A ---> $2B ----------> $3B ------------> $4B               */
4384  /*                                                                */
4385  /*                                                                */
4386  /*            V                                 V                 */
4387  /*   +---> $5A ----------> $6A ----->+        $10A <--------+     */
4388  /*   A                                                     A     */
4389  /*                                                                */
4390  /*            V   DIVISOR=0          V          V                 */
4391  /*          $20B --> $30A --> $31A   +---> $11B --------->+       */
4392  /*                   (FINIS)                              A       */
4393  /*                                                                */
4394  /*            V                                 V                 */
4395  /*          $22B                              $12B                */
4396  /*                                                                */
4397  /*                                                                */
4398  /*            V   DIVIDEND=0                                      */
4399  /*          $23B --> $35A --> $36A             $13B               */
4400  /*                   (FINIS)                  (FINIS)             */
4401  /*                                                                */
4402  /*            V                                                   */
4403  /*          +----> $24B                                           */
4404  /*                                                                */
4405  /*                                                                */
4406  /*            V                                                   */
4407  /*   +<---------- $25B --> $26B --> $27B -------------->+         */
4408  /*                                                                */
4409
4410
4411  BEGIN OD.
4412
4413  CSECT FCSA0:    ORIGIN '00'X:
4414
4415  OOR:    LONG_OPERAND -> RB1.
4416          LONG_OPERAND -> RB2.
4417          (RB1(1..7) - RB2(1..7)) -> EXPONENT_CALCULATION.
4418          EXPONENT_CALCULATION -> EXPR.
4419          RB1(0) XOR RB2(0) -> SIGN.
4420          SIGN -> SIGN_TRIGGER.
4421          RB2(8..67) -> WRITE_OP2_FRACTION.
4422          TPR4 -> WRITE_ADDRESS.
4423          RA1 -> RA1.                     /* OP1 (DIVIDEND) */
4424          TPR4->RA2,                      /* OP2 (DIVISOR)  */
4425          HOLD_NEXT_CYCLE -> RB_CONTROL.
4426          0 -> SUBTRACT_OPERATION.
4427          SUBTRACT_OPERATION -> SUBTRACT_TRIGGER.
4428          (RB1(8..11) ¬= 0) -> OP1_NORMAL_TRIGGER.
4429          (RB2(8..11) ¬= 0) -> OP2_NORMAL_TRIGGER.
4430          IF RB1(8..11) >= 4*RB2(8..11) THEN 1 ELSE 0 ENDF
4431                          -> DIVIDEND_GE_4_TIMES_DIVISOR_TRIGGER.
4432          IF RB1(8..11) < RB2(8..11) THEN 1 ELSE 0 ENDF
4433                          -> DIVIDEND_LT_DIVISOR_TRIGGER.
4434          (0/(0..1),RB1(8..63)/(2..57),0/(58..59)) -> PD.
4435          0 -> PB.
4436          RB2(8..67) -> Y_BUS.
4437          (Y_BUS/(0..59),0/(60..69)) -> BR.   /* OP2 (DIVISOR) */
4438          0 -> AR.            /* DIVISOR -> BR FOR RESIDUE CHECKING */
4439          0 -> CHECK_XY_BUS_PARITY.
4440          (RB2(8..67)=0) -> ZERO_TEST.
4441          ZERO_TEST -> ZERO_TRIGGER.
```

```
4443              1 -> TEST_DATA_VALID,
4444              1 -> BRANCH,
4445              $28 -> ADDRESS;
4447
4448
4449     CSECT FCSB;
4450
4451     $28:     LONG_OPERAND -> RB1,
4452              LONG_OPERAND -> RB2,
4453              RB1(8..67) -> WRITE_BUS_FRACTION,
4454              TPR2 -> WRITE_ADDRESS,
4455              IF DIVIDEND_GE_4_TIMES_DIVISOR_TRIGGER
4456                   THEN (0/(0..3),RB1(8..63)/(4..59))
4457                   ELSEIF DIVIDEND_LT_DIVISOR_TRIGGER
4458                        THEN (PD(2..59)/(0..57),0/(58..59))
4459                        ELSE (0/(0..1),RB1(8..63)/(2..57),0/(58..59)) ENDF -> PD,
4460              0 -> PB,
4461              /* 0 -> Q0_Q1 -> Q_BITS */
4462              0 -> REMAINDER_EQ_ZERO_TRIGGER,
4463              AR -> AR,
4464              BR -> BR,            /* HOLD AR AND BR FOR RESIDUE CHECKING */
4465              0 -> ACC,
4466              0 -> UM,
4467              (EXPR + '40'X) -> EXPONENT_CALCULATION,
4468              EXPONENT_CALCULATION -> EXPR,
4469              14 -> NORMALIZE_COUNT,
4470              NORMALIZE_COUNT -> SAR,
4471              ZERO_TRIGGER -> ZERO_TEST,
4472              ZERO_TEST -> ZERO_TRIGGER,
4473              RA2 -> RA2,
4474              HOLD_NEXT_CYCLE -> RB_CONTROL,
4475              DIVIDEND_GE_4_TIMES_DIVISOR_TRIGGER
4476                   | DIVIDEND_LT_DIVISOR_TRIGGER
4477                   | ~OP1_NORMAL_TRIGGER | ~OP2_NORMAL_TRIGGER -> BRANCH,
4478              $5A -> ADDRESS;
4480
4481
4482     CSECT FCSB,    /* OP2-FRAC(0..3) <= OP1-FRAC(0..3) < 4*OP2-FRAC(0..3) */
4483                    /* ALSO, BOTH FRACTIONS WERE NORMALIZED INITIALLY      */
4484
4485     $3B      (ACC(4..55)/(0..51),Q_BITS/(52..53),Q0_Q1/(54..55),0/(56..69))
4486                                                              -> ACC,
4487              0 -> UM,
4488              /* Q0_Q1 -> Q_BITS */
4489              BSA -> PD,
4490              BSA -> PB,
4491              (REMAINDER = 0) | REMAINDER_EQ_ZERO_TRIGGER
4492                                       -> REMAINDER_EQ_ZERO_TRIGGER,
4493              SAR - 1 -> SAR,           /* 13 -> SAR */
4494              RB2(8..67) -> Y_BUS,
4495              (Y_BUS(0..59),0/(60..69)) -> BR,   /* OP2 (DIVISOR) */
4496              0 -> AR,    /* DATA IN AR AND BR IS USED FOR RESIDUE CHECKING */
4497                    /* RELOAD DATA INTO BR IN ORDER TO CHECK PARITY OF Y_BUS */
4498              RA2 -> RA2,
4499              HOLD_NEXT_CYCLE -> RB_CONTROL;
4500
4501     $4B      IF Q_BITS = 0 THEN SAR + 1 ELSE SAR ENDF -> SAR,
4502              EXPR + 1 -> EXPONENT_CALCULATION,
4503              IF Q_BITS = 0 THEN EXPR ELSE EXPONENT_CALCULATION ENDF -> EXPR,
4504              /* Q0_Q1 -> Q_BITS */
4505              BSA -> PD,
4506              BSA -> PB,
4507              (REMAINDER = 0) | REMAINDER_EQ_ZERO_TRIGGER
4508                                       -> REMAINDER_EQ_ZERO_TRIGGER,
4509              AR -> AR,
4510              BR -> BR,            /* HOLD AR AND BR FOR RESIDUE CHECKING */
4511              RA2 -> RA2,
4512              HOLD_NEXT_CYCLE -> RB_CONTROL,
4513              1 -> BRANCH,
4514              $10A -> ADDRESS;
4515
4516
```

```
4518
4519
4520    CSECT FCSA1;    /* OP2-FRAC(0..3) > OP1-FRAC(0..3), OR             */
4521                    /* OP1-FRAC(0..3) > 4*OP2-FRAC(0..3), OR           */
4522                    /* EITHER FRACTION WAS NOT NORMALIZED INITIALLY    */
4523
4524    $5A:    /* OO_Q1 -> Q_BITS */
4525            BSA -> PO,
4526            BSA -> PB,
4527            (REMAINDER = 0) | REMAINDER_EQ_ZERO_TRIGGER
4528                                    -> REMAINDER_EQ_ZERO_TRIGGER,
4529            ZERO_TRIGGER -> ZERO_TEST,
4530            ZERO_TEST -> ZERO_TRIGGER,
4531            RB2(8..67) -> Y_BUS,
4532            (Y_BUS/(0..59),0/(60..69)) -> BR,   /* OP2 (DIVISOR) */
4533            0 -> AR,        /* DATA IN AR AND BR IS USED FOR RESIDUE CHECKING */
4534                    /* RELOAD DATA INTO BR IN ORDER TO CHECK PARITY OF Y_BUS */
4535            TPR2 -> RA1,
4536            RA2 -> RA2,
4537            HOLD_NEXT_CYCLE -> RB_CONTROL,
4538            0 -> SUBTRACT_OPERATION,
4539            SUBTRACT_OPERATION -> SUBTRACT_TRIGGER,
4540            0 -> CARRY_TRIGGER,
4541            ¬OP1_NORMAL_TRIGGER | ¬OP2_NORMAL_TRIGGER -> BRANCH,
4542            $208 -> ADDRESS;
4543
4544    $8A:    (ACC(4..55)/(0..51),Q_BITS/(52..53),OO_Q1/(54..55),0/(56..69))
4545                                    -> ACC,
4546            0 -> UM,
4547            SAR - 1 -> SAR,             /* 13 -> SAR */
4548            EXPR + 1 -> EXPONENT_CALCULATION,
4549            IF DIVIDEND_GE_4_TIMES_DIVISOR_TRIGGER
4550                    THEN EXPONENT_CALCULATION ELSE EXPR ENDF -> EXPR,
4551            BSA -> PO,
4552            BSA -> PB,
4553            (REMAINDER = 0) | REMAINDER_EQ_ZERO_TRIGGER
4554                                    -> REMAINDER_EQ_ZERO_TRIGGER,
4555            /* OO_Q1 -> Q_BITS */    /* NEEDED FOR RESIDUE CHECKING */
4556            AR -> AR,
4557            BR -> BR,                   /* HOLD AR AND BR FOR RESIDUE CHECKING */
4558            RA2 -> RA2,
4559            HOLD_NEXT_CYCLE -> RB_CONTROL,
4560            1 -> BRANCH,
4561            $118 -> ADDRESS;
4562
4563
4564
4565    CSECT FCSA1;            /* DIVIDE LOOP */
4566
4567    $10A    (ACC(4..55)/(0..51),Q_BITS/(52..53),OO_Q1/(54..55),0/(56..69))
4568                                    -> ACC,
4569            0 -> UM,
4570            BSA -> PO,
4571            BSA -> PB,
4572            (REMAINDER = 0) | REMAINDER_EQ_ZERO_TRIGGER
4573                                    -> REMAINDER_EQ_ZERO_TRIGGER,
4574            /* OO_Q1 -> Q_BITS */    /* NEEDED FOR RESIDUE CHECKING */
4575            SAR - 1 -> SAR,
4576            AR -> AR,
4577            BR -> BR,                   /* HOLD AR AND BR FOR RESIDUE CHECKING */
4578            RA2 -> RA2,
4579            HOLD_NEXT_CYCLE -> RB_CONTROL,
4580            1 -> BRANCH,
4581            $118 -> ADDRESS;
4582
4583    CSECT FCSB;
4584
4585    $118    /* OO_Q1 -> Q_BITS */
4586            BSA -> PO,
4587            BSA -> PB,
4588            (REMAINDER = 0) | REMAINDER_EQ_ZERO_TRIGGER
4589                                    -> REMAINDER_EQ_ZERO_TRIGGER,
4590            RA2 -> RA2,
4591            HOLD_NEXT_CYCLE -> RB_CONTROL,
4592            AR -> AR,
```

```
4593            BR -> BR,                /* HOLD AR AND BR FOR RESIDUE CHECKING */
4594            (SAR > 1) & ¬REMAINDER_EQ_ZERO_TRIGGER -> BRANCH,
4595            $10A -> ADDRESS;
4597
4598
4599    CSECT FCSB:                      /* FINISH UP */
4600
4601    $12B: (ACC(4..55)/(0..51).Q_BITS/(52..53).00_01/(54..55).0/(56..69))
4602                                                               -> ACC,
4603            0 -> UM,
4604            BSA -> PO,       /* INVOKE THIS PB_PO CONTROL TO       */
4605            BSA -> PB,       /*    FORCE PROPER 00_01 GENERATION   */
4606            SAR - 1 -> SAR,
4607            AR -> AR,
4608            BR -> BR,                /* HOLD AR AND BR FOR RESIDUE CHECKING */
4609            1 -> ENDING_NEXT_CYCLE;
4610
4611    $13B: SIGN_TRIGGER -> SIGN,
4612            0 -> ZERO_TEST,
4613            SIGN & ¬ZERO_TEST & (EXU_MASK | ¬EXPR(-1)) -> WRITE_BUS_SIGN,
4614            IF (ZERO_TEST | (EXPR(-1) & ¬EXU_MASK)) THEN 0
4615                     ELSE EXPR(1..7) ENDF -> WRITE_BUS_EXP,
4616            IF (ZERO_TEST | (EXPR(-1) & ¬EXU_MASK)) THEN 0
4617                 ELSE PN_SHIFTER ENDF -> WRITE_BUS_FRACTION,
4618            SAR -> NORMALIZE_SHIFT_AMOUNT,
4619            OP1AR -> WRITE_ADDRESS,
4620            LONG -> WRITE_LENGTH,
4621            1 -> RESET_RETRY_POINT,
4622            EXPR(0) & ¬EXPR(-1) -> EXO_INTERRUPT,
4623            EXPR(-1) & EXU_MASK & ¬ZERO_TEST -> EXU_INTERRUPT,
4624            R1 -> OP1AR,
4625            R2 -> OP2AR,
4626            R1 -> RA1,
4627            R2 -> RA2,
4628            0 -> SAR,
4629            1 -> LAST_X_CYCLE,
4630            1 -> BRANCH,
4631            IDLE_LOOP_A -> ADDRESS;
4633
4634
4635    CSECT FCSB:     /* OPERANDS NEED TO BE NORMALIZED */
4636
4637    $20B  LONG_OPERAND -> RB1,        /* OP1 (DIVIDEND) */
4638            RB1(8..63) -> X_BUS,
4639            (X_BUS/(0..55).0/(56..69)) -> AR,           /* OP1 */
4640            0 -> BR,
4641            0 -> CHECK_XY_BUS_PARITY,
4642            HOLD_NEXT_CYCLE -> RB_CONTROL,
4643            AA_SUM -> ACC,            /* OP2 (DIVISOR) */
4644            0 -> UM,
4645            0 -> SUBTRACT_OPERATION,
4646            SUBTRACT_OPERATION -> SUBTRACT_TRIGGER,
4647            0 -> CARRY_TRIGGER,
4648            RA1 -> RA1,
4649            TPR2 -> RA2,
4650            ZERO_TRIGGER -> BRANCH,
4651            $30A -> ADDRESS;          /* BRANCH IF DIVISOR = 0 */
4652
4653    $22B. AA_SUM -> ACC,              /* OP1 (DIVIDEND) */
4654            0 -> UM,
4655            PN_SHIFTER -> WRITE_BUS_FRACTION,
4656            IF CARRY_TRIGGER THEN RIGHT 1 ELSE LEFT LEADING_ZERO_DIGIT_COUNT
4657                                       ENDF -> NORMALIZE_SHIFT_AMOUNT,
4658            TPR4 -> WRITE_ADDRESS,    /* OP2 (DIVISOR) */
4659            LONG -> WRITE_LENGTH,
4660            LEADING_ZERO_DIGIT_COUNT -> NORMALIZE_COUNT,
4661            EXPR + NORMALIZE_COUNT -> EXPONENT_CALCULATION,
4662            EXPONENT_CALCULATION -> EXPR,
4663            0 -> SUBTRACT_OPERATION,
4664            SUBTRACT_OPERATION -> SUBTRACT_TRIGGER,
4665            0 -> CARRY_TRIGGER,
4666            LONG_OPERAND -> RB1,
4667            RB1(8..63) -> X_BUS,      /* RELOAD AR TO CHECK X_BUS PARITY */
4668            (X_BUS/(0..55).0/(56..69)) -> AR,
```

```
4669        0 -> BR.
4670        LONG_OPERAND -> RB2.         /* OP1 (DIVIDEND) */
4671        (RB2(8..67)=0) -> ZERO_TEST.
4672        ZERO_TEST -> ZERO_TRIGGER;
4673
4674  $23B  PN_SHIFTER -> WRITE_BUS_FRACTION.
4675        IF CARRY_TRIGGER THEN RIGHT 1 ELSE LEFT LEADING_ZERO_DIGIT_COUNT
4676                                   ENDF -> NORMALIZE_SHIFT_AMOUNT.
4677        TPR2 -> WRITE_ADDRESS.       /* OP1 (DIVIDEND) */
4678        LONG -> WRITE_LENGTH.
4679        LEADING_ZERO_DIGIT_COUNT -> NORMALIZE_COUNT.
4680        IF CARRY_TRIGGER THEN EXPR + 1 ELSE EXPR - NORMALIZE_COUNT ENDF
4681                                             -> EXPONENT_CALCULATION.
4682        EXPONENT_CALCULATION -> EXPR.
4683        TPR2 -> RA1.
4684        TPR4 -> RA2.
4685        ZERO_TRIGGER -> BRANCH.
4686        $35A -> ADDRESS;   /* BRANCH IF DIVIDEND = 0 */
4687
4688
4689  CSECT FCSB;  /* OPERANDS HAVE BEEN NORMALIZED -- NOW TO START OVER */
4690
4691
4692  $24B: LONG_OPERAND -> RB1.
4693        LONG_OPERAND -> RB2.
4694        RA1 -> RA1.
4695        RA2 -> RA2.
4696        HOLD_NEXT_CYCLE -> RB_CONTROL.
4697        0 -> SUBTRACT_OPERATION.
4698        SUBTRACT_OPERATION -> SUBTRACT_TRIGGER.
4699        (RB1(8..11) ¬= 0) -> OP1_NORMAL_TRIGGER.   /* SET THESE  */
4700        (RB2(8..11) ¬= 0) -> OP2_NORMAL_TRIGGER.   /*    TRIGGERS */
4701        IF RB1(8..11) >= 4*RB2(8..11) THEN 1 ELSE 0 ENDF
4702                              -> DIVIDEND_GE_4_TIMES_DIVISOR_TRIGGER.
4703        IF RB1(8..11) < RB2(8..11) THEN 1 ELSE 0 ENDF
4704                              -> DIVIDEND_LT_DIVISOR_TRIGGER.
4705        RB2(8..67) -> Y_BUS.
4706        0 -> AR.      /* DIVISOR -> BR FOR RESIDUE CHECKING */
4707        (Y_BUS/(0..59),0/(60..69)) -> BR.  /* OP2 */
4708        0 -> CHECK_XY_BUS_PARITY.
4709        (0/(0..1),RB1(8..63)/(2..57),0/(58..59)) -> PO.
4710        0 -> PB;
4711
4712  $25B: LONG_OPERAND -> RB1.
4713        LONG_OPERAND -> RB2.
4714        IF DIVIDEND_GE_4_TIMES_DIVISOR_TRIGGER
4715           THEN (0/(0..3),RB1(8..63)/(4..59))
4716           ELSEIF DIVIDEND_LT_DIVISOR_TRIGGER
4717              THEN (PO(2..59)/(0..57),0/(58..59))
4718              ELSE (0/(0..1),RB1(8..63)/(2..57),0/(58..59)) ENDF -> PO.
4719        0 -> PB.
4720        /* 0 -> 00_01 -> Q_BITS */
4721        0 -> REMAINDER_EQ_ZERO_TRIGGER.
4722        RB2(8..67) -> Y_BUS.
4723        (Y_BUS/(0..59),0/(60..69)) -> BR.  /* OP2 (DIVISOR) */
4724        0 -> AR.     /* DATA IN AR AND BR IS USED FOR RESIDUE CHECKING */
4725                /* RELOAD DATA INTO BR IN ORDER TO CHECK PARITY OF Y_BUS */
4726        0 -> ACC.
4727        0 -> UM.
4728        14 -> NORMALIZE_COUNT.
4729        NORMALIZE_COUNT -> SAR.
4730        0 -> ZERO_TEST.
4731        ZERO_TEST -> ZERO_TRIGGER.
4732        RA2 -> RA2.
4733        HOLD_NEXT_CYCLE -> RB_CONTROL.
4734        DIVIDEND_GE_4_TIMES_DIVISOR_TRIGGER
4735           | DIVIDEND_LT_DIVISOR_TRIGGER
4736           | ¬OP1_NORMAL_TRIGGER | ¬OP2_NORMAL_TRIGGER ->  BRANCH.
4737        $5A -> ADDRESS;
4738
4739
4740  CSECT FCSB.
4741
4742  $26B  (ACC(4..55)/(0..51),Q_BITS/(52..53),00_01/(54..55),0/(56..69))
4743                                             -> ACC.
```

```
4745        0 -> UM,
4746        /* 00_01 -> Q_BITS */
4747        BSA -> PO,
4748        BSA -> PB,
4749        (REMAINDER = 0) | REMAINDER_EQ_ZERO_TRIGGER
4750                                -> REMAINDER_EQ_ZERO_TRIGGER,
4751        AR -> AR,
4752        BR -> BR,           /* HOLD AR AND BR FOR RESIDUE CHECKING */
4753        SAR - 1 -> SAR,     /* 13 -> SAR */
4754        RA2 -> RA2,
4755        HOLD_NEXT_CYCLE -> RB_CONTROL;
4756
4757  $27B: IF Q_BITS = 0 THEN SAR + 1 ELSE SAR ENDF -> SAR,
4758        EXPR + 1 -> EXPONENT_CALCULATION,
4759        IF Q_BITS = 0 THEN EXPR ELSE EXPONENT_CALCULATION ENDF -> EXPR,
4760        /* 00_01 -> Q_BITS */
4761        BSA -> PO,
4762        BSA -> PB,
4763        (REMAINDER = 0) | REMAINDER_EQ_ZERO_TRIGGER
4764                                -> REMAINDER_EQ_ZERO_TRIGGER,
4765        AR -> AR,
4766        BR -> BR,           /* HOLD AR AND BR FOR RESIDUE CHECKING */
4767        RA2 -> RA2,
4768        HOLD_NEXT_CYCLE -> RB_CONTROL,
4769        1 -> BRANCH,
4770        $10A -> ADDRESS;
4772
4773
4774  CSECT FCSA1;
4775
4776  $30A: 1 -> ENDING_NEXT_CYCLE;           /* DIVISOR = 0 */
4777
4778  $31A: 1 -> FLOATING_POINT_DIVIDE_INTERRUPT,
4779        R1 -> OP1AR,
4780        R2 -> OP2AR,
4781        R1 -> RA1,
4782        R2 -> RA2,
4783        0 -> SAR,
4784        1 -> RESET_RETRY_POINT,
4785        1 -> LAST_X_CYCLE,
4786        1 -> BRANCH,
4787        IDLE_LOOP_B -> ADDRESS;
4788
4789
4790
4791
4792
4793
4794  $35A: 1 -> ENDING_NEXT_CYCLE,           /* DIVIDEND = 0 */
4795        ZERO_TRIGGER -> ZERO_TEST,
4796        ZERO_TEST -> ZERO_TRIGGER;
4797
4798  $36A: 1 -> ZERO_TEST,
4799        SIGN & ¬ZERO_TEST & (EXU_MASK | ¬EXPR(-1)) -> WRITE_BUS_SIGN,
4800        IF (ZERO_TEST | (EXPR(-1) & ¬EXU_MASK)) THEN 0
4801                ELSE EXPR(1..7) ENDF -> WRITE_BUS_EXP,
4802        IF (ZERO_TEST | (EXPR(-1) & ¬EXU_MASK)) THEN 0
4803            ELSE PN_SHIFTER ENDF -> WRITE_BUS_FRACTION,
4804        OP1AR -> WRITE_ADDRESS,
4805        LONG -> WRITE_LENGTH,
4806        1 -> RESET_RETRY_POINT,
4807        R1 -> OP1AR,
4808        R2 -> OP2AR,
4809        R1 -> RA1,
4810        R2 -> RA2,
4811        0 -> SAR,
4812        1 -> LAST_X_CYCLE,
4813        1 -> BRANCH,
4814        IDLE_LOOP_B -> ADDRESS;
4815
4816  ENDB DO;
```

I claim:

1. Data processing apparatus for use in association with a functional unit having a first destination latch point for receiving first destination latch point input information, for use in further association with a clock and a control means for generating control signals to operate the functional unit, the control signals being updated once each clock cycle, the control means operating the functional unit such that the first destination latch point input information is required at the first destination latch point on a first given clock cycle, the apparatus comprising:

a first source latch point coupled to the first destination latch point via a first path, the path delay from the first source latch point to the first destination latch point being between n-1 and n clock cycles, $n>1$;

means for latching first source latch point information at the first source latch point on a first setup cycle at least n clock cycles before the first given clock cycle, and for retaining the first source latch point information at the first source latch point through the first given clock cycle; and means for preventing a glitch from occurring in the output of the first source latch point in response to interim clock cycles between the first setup clock cycle and the first given clock cycle.

2. Apparatus according to claim 1, wherein $n=2$.

3. Apparatus according to claim 1, wherein the functional unit is a multi-step unit which requires the first destination latch point input information to remain constant through a final clock cycle subsequent to the first given clock cycle, further comprising means for retaining the first source latch point information at the first source latch point through the final clock cycle.

4. Apparatus according to claim 1, further comprising:

a combinational logic circuit coupled in the first path between the first source latch point and the first destination latch point, the combinational logic circuit having first and second inputs and an output, the first input of the combinational logic circuit being coupled to the first source latch point and the output of the combinational logic circuit being coupled to the first destination latch point;

a second source latch point coupled to the second input of the combinational logic circuit, the path delay from the second source latch point, through the combinational logic circuit to the first destination latch point being between m-1 and m clock cycles;

means for latching second source latch point information at the second source latch point on a second setup clock cycle at least m clock cycles before the first given clock cycle, and for retaining the second source latch point information at the second source latch point through the first given clock cycle; and means for preventing a glitch from occurring in the output of the second source latch point in response to clock cycles between the second setup clock cycle and the first given clock cycle.

5. Apparatus according to claim 4, wherein $m=1$ and the second source latch point is the first destination latch point.

6. Apparatus according to claim 1, wherein the functional unit further has a second destination latch point for receiving second destination latch point input information, the first source latch point being coupled further to the second destination latch point via a second path, the path delay from the first source latch point to the second destination latch point being between p−1 and p clock cycles, $0<p<n$, and wherein the control unit operates the functional unit further such that the second destination latch point input information is required at the second destination latch point no earlier than a second given clock cycle p clock cycles following the first setup clock cycle.

7. Apparatus according to claim 1 wherein the means for preventing a glitch comprises means for gating the clock input to the first source latch point such that the clock signals representing the interim clock cycles are prevented from reaching the first source latch point.

8. A register complex for use in a data processing system, the data processing system having a functional unit, the functional unit having an input latch point, the data processing system further having a control means for generating control signals to operate the functional unit, the control signals being updated once each clock cycle, the data processing system further having control latches for latching the control signals, the control means operating the functional unit such that data from the register complex is required at the input latch point of the functional unit on a given clock cycle, the register complex comprising:

at least one data register having a clock input, a data input and a data output;

a data selector having an output, a control input and at least a first and second data input, the first input of the data selector being coupled to the data output of the data register and the output of the data selector being coupled to the input latch point in the functional unit, the path delay from the data register, through the data selector to the input latch point being between 1 and 2 clock cycles;

a selector control register having a clock input and an output, the output of the selector control register being coupled to the control input of the data selector, the path delay from the selector control register, through the data selector to the input latch point of the functional unit being between 1 and 2 clock cycles;

means for loading first information into the data register on a first setup clock cycle at least two clock cycles prior to the given clock cycle;

means for holding the first information in the data register constant and glitch-free from the first setup clock cycle through the given clock cycle;

means for loading second information into the selector control register on a second setup clock cycle at least two clock cycles prior to the given clock cycle; and means for holding the second information in the selector control register constant and glitch-free from the second setup clock cycle through the given clock cycle.

9. A register complex according to claim 8, further comprising:

a write control register having an output, the write control register being capable of storing an enabling value to indicate that the data register should be loaded on the current clock cycle or a disabling value to indicate that the data register should not be loaded on the current clock cycle; and gate means coupled between the clock signal and the clock input of the data register, the gate means having a control input coupled to the output of the write control register, wherein the means for loading first information comprises means for loading the write control register with the enabling value prior to the first setup clock cycle and means for presenting the first information to the data input of the data register on the first setup clock cycle, and wherein the means for holding the first information comprises means for loading the write control register with the disabling value on the first setup clock cycle and means for retaining the disabling value in the write control register from before the first setup clock cycle through the clock cycle preceding the given clock cycle.

10. A register complex according to claim 8, further comprising:
- a gate control register having an output, the gate register being capable of storing an enabling value to indicate that the selector control register should be loaded on the current clock cycle or a disabling value to indicate that the selector control register should not be loaded on the current clock cycle; and
- gate means coupled between the clock signal and the clock input of the selector control register, the gate means having a control input coupled to the gate control register,
- wherein the means for loading second information comprises means for loading the gate control register with the enabling value prior to the second setup clock cycle and means for presenting the second information to the input of the selector control register on the second setup clock cycle, and
- wherein the means for holding the second information comprises means for loading the gate control register with the disabling value on the second setup clock cycle and means for retaining the disabling value in the gate control register from the second setup clock cycle through the clock cycle preceding the given clock cycle.

11. A register complex according to claim 10, wherein the means for presenting the second information to the input of the selector control register comprises a selector control data selector having an output coupled to the input of the selected control register and having a control input coupled to the output of the gate control register, the gate control register thereby providing the dual function of controlling the gate means and controlling the selector control data selector.

12. Data processing apparatus for use in association with a functional unit having a destination latch point for receiving destination latch point input information, for use in further association with a clock and a control means for generating control signals to operate the functional unit, the control signals being updated once each clock cycle, the control means operating the functional unit such that the destination latch point input information is required at the destination latch point on a given clock cycle, the apparatus comprising:
- a source latch point coupled to the destination latch point via a first pat, the path delay from the source latch point to the destination latch point being between n−1 and n clock cycles, n>1;
- means for latching source latch point information at the source latch point on a setup cycle at least n clock cycles before the given clock cycle, and for retaining the source latch point information at the source latch point through the given clock cycle; and
- means for preventing a glitch from occurring in the output of the source latch point in response to interim clock cycles between (a) a first clock cycle at least as late as the setup clock cycle and at least n clock cycles before the given clock cycle and (b) the first given clock cycle.

13. Data processing apparatus according to claim 12, wherein the setup clock cycle is exactly n clock cycles before the given clock cycle and wherein the first clock cycle also is exactly n clock cycles before the given clock cycle.

14. A register complex for use in a data processing system, the data processing system having a functional unit, the functional unit having an input latch point, the data processing system further having a control means for generating control signals to operate the functional unit, the control signals being updated once each clock cycle, the data processing system further having control latches or latching the control signals, the control means operating the functional unit such that data from the register complex is required at the input latch point of the functional unit on a given clock cycle, the register complex comprising:
- at least one data register having a clock input, a data input and a data output;
- a data selector having an output, a control input and at least a first and second data input, the first input of the data selector being coupled to the data output of the data register and the output of the data selector being coupled to the input latch point in the functional unit, the path delay from the data register, through the data selector to the input latch point of the functional unit being between 1 and 2 clock cycles;
- a selector control register having a clock input and an output, the output of the selector control register being coupled to the control input of the data selector, the path delay from the selector control register, through the data selector to the input latch point of the functional unit being between 1 and 2 clock cycles;
- a write control register having an output, the write control register being capable of storing a first enabling value to indicate that the data register should be loaded on the current clock cycle or a first disabling value to indicate that the data register should not be loaded on the current clock cycle;
- first gate means coupled between the clock signal and the clock input of the data register, the first gate means having a control input coupled to the output of the write control register;
- means for loading the write control register with the first enabling value prior to a first setup clock cycle at least two clock cycles prior to the given clock cycle;
- means for presenting first information to the data input of the data register on the first setup clock cycle;
- means for loading the write control register with the first disabling value on the first setup clock cycle;
- means for retaining the first disabling value in the write control register from before the first setup clock cycle through the clock cycle preceding the given clock cycle;

a second gate control register having an output, the second gate register being capable of storing a second enabling value to indicate that the selector control register should be loaded on the current clock cycle or a second disabling value to indicate that the selector control register should not be loaded on the current clock cycle;

second gate means coupled between the clock signal and the clock input of the selector register, the second gate means having a control input coupled to the gate control register;

means for loading the gate control register with the second enabling value prior to a second setup clock cycle at least two clock cycles prior to the given clock cycle;

means for presenting second information to the input of the selector control register on the second setup clock cycle;

means for loading the gate control register with the second disabling value on the second setup clock cycle; and means for retaining the second disabling value in the gate control register from the second setup clock cycle through the clock cycle preceding the given clock cycle.

15. A register complex according to claim 14, wherein the means for presenting the second information to the input of the selector control register comprises a selector control data selector having an output coupled to the input of the selector control register and having a control input coupled to the output of the gate control register, the gate control register thereby providing the dual function of controlling the second gate means and controlling the selector control data selector.

* * * * *